United States Patent
Mazanec et al.

[11] Patent Number: 6,019,885
[45] Date of Patent: *Feb. 1, 2000

[54] SOLID MULTI-COMPONENT MEMBRANES, ELECTROCHEMICAL REACTOR COMPONENTS, ELECTROCHEMICAL REACTORS AND USE OF MEMBRANES, REACTOR COMPONENTS, AND REACTOR FOR OXIDATION REACTIONS

[75] Inventors: Terry J. Mazanec, Solon; Thomas L. Cable, Newbury; John G. Frye, Jr.; Wayne R. Kliewer, both of Solon, all of Ohio

[73] Assignee: The Standard Oil Company, Cleveland, Ohio

[*] Notice: This patent is subject to a terminal disclaimer.

[21] Appl. No.: 08/487,945

[22] Filed: Jun. 7, 1995

Related U.S. Application Data

[62] Division of application No. 08/394,925, Feb. 24, 1995, Pat. No. 5,591,315, which is a continuation of application No. 08/228,793, Apr. 15, 1994, abandoned, which is a division of application No. 07/618,792, Nov. 27, 1990, Pat. No. 5,306,411, which is a continuation-in-part of application No. 07/457,327, Dec. 27, 1989, abandoned, and application No. 07/457,340, Dec. 27, 1989, abandoned, which is a continuation-in-part of application No. 07/025,511, Mar. 13, 1987, Pat. No. 4,933,054, application No. 07/457,384, Dec. 27, 1989, abandoned, and application No. 07/510,296, Apr. 16, 1990, abandoned, which is a continuation-in-part of application No. 07/357,317, May 25, 1989, abandoned.

[51] Int. Cl.[7] .................................................. C25B 1/02
[52] U.S. Cl. ........................... 205/633; 205/462; 205/634
[58] Field of Search ..................... 205/433, 462, 205/628, 629, 630, 631, 632, 633, 634, 635, 636, 637, 638; 95/54

[56] References Cited

U.S. PATENT DOCUMENTS

| | | | |
|---|---|---|---|
| 3,400,054 | 9/1968 | Ruka et al. | 205/412 |
| 3,630,879 | 12/1971 | Spacil et al. | 204/248 |
| 3,650,920 | 3/1972 | Hickam et al. | 205/634 |
| 4,126,580 | 11/1978 | Lauder | 502/303 |

(List continued on next page.)

FOREIGN PATENT DOCUMENTS

| | | |
|---|---|---|
| 0008430 | 8/1979 | European Pat. Off. . |
| 0023813 | 7/1980 | European Pat. Off. . |
| 0097770 | 3/1983 | European Pat. Off. . |
| 0345393 | 6/1988 | European Pat. Off. . |
| 0311307 | 9/1988 | European Pat. Off. . |
| 0318808 | 11/1988 | European Pat. Off. . |
| 1809367 | 11/1968 | Germany . |
| 1817719 | 7/1970 | Germany . |
| 2738756 | 8/1977 | Germany . |
| 58-183947 | 10/1983 | Japan . |
| 61-30688 | 2/1986 | Japan . |
| 61-293550 | 12/1986 | Japan . |
| 62-282640 | 12/1987 | Japan . |
| 408648 | 9/1974 | Russian Federation . |
| 2203446 | 3/1988 | United Kingdom . |
| 8302605 | 11/1982 | WIPO . |

OTHER PUBLICATIONS

English language translation JP58183947 (Matsushita et al.), Oct. 27, 1983.
CAPlus Abstract of JP61293550 (Nissan), Dec. 24, 1986.
WPIDS abstract of JP1293550 (Nissan), Dec. 24, 1986.
JAPIO abstract of JP61293550 (Nissan), Dec. 24, 1986.

(List continued on next page.)

*Primary Examiner*—Robert Warden
*Assistant Examiner*—Alex Noguerola
*Attorney, Agent, or Firm*—Thomas A. Yassen; Frank J. Sroka

[57] ABSTRACT

An electrochemical process for extracting oxygen from an oxygen-containing gas which uses an electrochemical cell having two zones separated by a multi-component membrane made from intimate, gas-impervious, multi-phase mixture of an electronically conductive phase and an oxygen ion-conducting phase. In one zone a gas containing oxygen is passed in contact with the membrane. In the other zone a gas capable of reacting with oxygen is passed in contact with the membrane.

16 Claims, 3 Drawing Sheets

U.S. PATENT DOCUMENTS

| | | | |
|---|---|---|---|
| 4,130,683 | 12/1978 | Van Den Berghe et al. | 428/194 |
| 4,253,825 | 3/1981 | Mason | 432/149 |
| 4,253,925 | 3/1981 | Mason . | |
| 4,315,864 | 2/1982 | Bremer et al. | 549/259 |
| 4,327,238 | 4/1982 | Eastman | 585/661 |
| 4,329,208 | 5/1982 | Vayenas et al. | 205/428 |
| 4,330,633 | 5/1982 | Yoshisato et al. | 501/152 |
| 4,347,395 | 8/1982 | Chu et al. | 585/420 |
| 4,350,835 | 9/1982 | Chester et al. | 585/415 |
| 4,360,598 | 11/1982 | Otagiri et al. | 501/103 |
| 4,368,346 | 1/1983 | Eastman | 585/658 |
| 4,389,337 | 6/1983 | Eastman | 502/303 |
| 4,396,537 | 8/1983 | Eastman | 502/213 |
| 4,457,813 | 7/1984 | Rogers | 205/415 |
| 4,462,876 | 7/1984 | DeLue et al. | 205/428 |
| 4,524,236 | 6/1985 | McCain | 585/658 |
| 4,596,787 | 6/1986 | Manyik et al. | 502/312 |
| 4,636,286 | 1/1987 | DeLue et al. | 205/413 |
| 4,636,371 | 1/1987 | Farha, Jr. | 423/244.1 |
| 4,643,806 | 2/1987 | Hegedus et al. | 205/455 |
| 4,659,448 | 4/1987 | Gordon | 204/277 |
| 4,705,609 | 11/1987 | Cook | 205/433 |
| 5,591,315 | 1/1997 | Mazanec et al. | 205/462 |

OTHER PUBLICATIONS

English language translation of JP58183947 (Matsushita et al.), Oct. 27, 1983.

CAPlus abstract of JP58183947 (Matsushita et al.), Oct. 27, 1983.

WPIDS abstract of JP58183947 (Matsushita et al.), Oct. 27, 1983.

JAPIO abstract of JP58183947 (Matsushita et al.), Oct. 27, 1983.

CAPLUS abstract of JP58183947 (Matsushita Electric Industrial CO.), Oct. 27, 1983.

JAPIO abstract of JP58183947 (MAtsushita Electric Industrial Co.), Oct. 27, 1983.

WPIDS abstract of JP58183947 (Matsushita Electric Industrial Co.), Oct. 27, 1983.

Skarchenko, Oxidative Dehydrogenation of Hydrocarbons, pp. 1–23, vol. 9 No. 1, International Chemical Engineering (1969), no month available.

Pancharatan et al, "Catalytic Decomposition of Nitric Oxide on Zirconia by Electrolytic Removal of Oxygen", pp. 868–875, vol. 122, No. 7, J. Electrochemical Society, (1975), no month available.

Langer et al., "Electrogenerative & Voltameiotic Processes," pp. 567–579, vol. 18, No. 4, Ind. Eng. Chem. Process, Des. Dev., (1979), no month available.

Satteffield, "Heterogenous Catalysis in Practice," cc. 8 & 9, pp. 199–279, Mc Graw–Hill, (1980), no month available.

Ounalli et al., "Hydrogen Production by Direct Thermolysis on Water on Semi–Permeable Membrane", pp. 1185–1190, C.R. Academy Science Paris (1981), no month available.

Cales et al., Fluorite–type Solid Electrolytes as Oxygen Ion & Mixed Conductors, Progress in Solid Electrolytes, Wheat, T.A., et al., Energy of Mines and Resources, Ottawa, Canada (1983), no month available.

Michaels et al., "Kinetics of Vapor–Phase Electrochemical Oxidative Dehydrogenation of Ethylbenzene", vol. 85, pp. 477–487, Journal of Catalysis, (1984), no month available.

J.N. Michaels et al, "Styrene Production from Ethylbenzene on Platinum in a Zirconia Electrochemical Reactor", J. Electrochem. Soc., pp. 2544–2550 (1984), no month available.

Otsuka et al (1), "Steam Reforming of Hydrocarbons and Water Gas Shift Reaction", vol. 57, pp. 3286–3289, Bulletin of Chemical Society, Japan (1984), no month available.

Otsuka et al (II), "Catalytic Activity and Selectivity Control for Oxidation Coupling, etc.", pp. 319–322, Chemistry Letters, Chem. Society of Japan (1985), no month available.

Otsuka et al. (III), "The Catalysts Active and Selective in Oxidative Coupling of Methane", pp. 499–500, Chemistry Letters, Chemical Society of Japan (1985), no month available.

Iwamatsu et al., "Importance of the Specific Surface Area of the Catalyst in Oxidative, etc.," pp. 19–20, J.Chem.Soc., Chem. Communication (1987), no month available.

"Electrochemical Abatement of Pollutants Nox and SOx in Combustion Exhaust Gases Employing a Solid–Oxide Electrolyte, etc." from DOE/METC–Sponrored Contractors Review Meeting (1987) Markel, K.E. Jr. editor U.S. Department of Energy–Office of Fossil Energy (1987), no month available.

Hutchings et al., "Partial Oxidation of Methane Using 03,N02 & 02, etc." Proceedings, 9th International Congress on Catalysis, Phillips et al. Eds. vol. 2, pp. 923–929, no date available.

"IGR Uses 1–Volt Attack on SOx, NOx", pp. 5–6, Coal & Sunfuels Tech. (1988), no month available.

Haggin (1), "Oxidative Coupling Routes for Methane Proposed", p. 30, reporting presentation at 1989 International Chem. Congress of Pacific Basin Society in Honolulu, Hawaii Dec. 1989, C&EN, (1990), no month available.

Haggin (II), "Maximizing Yield of C2 Products from Methane", p. 35, reporting presentation at 1989 Int. Chem. Congress Pacific Basin Society in Hawaii, C&EN (1990).

Pujare N.U., et al. "Methane Activation of $C_2$ Hydrocarbon Species in Solid Oxide Fuel Cell", pp. 2544–2545, vol. 135, No. 10, Journal of the Electrochemical Society (1988), no month available.

Teraoka, Y. et al., "Development of Oxygen Semipermeable Membrane Using Mixed Conductive Perovskite–Type Oxides (Part 2)–Preparation of Dense Film", pp. 523–529, Journal of the Ceramic Society of Japan, Int. Ed. (1989), no month available.

Teraoka, Y. et al, "Effect of Cation Substitution on the Oxygen Semi–Permeability of Perovskite–Type Oxides", pp. 503–506, The Chemical Society of Japan (1988), no month available.

Teraoka, Y. et al, "Oxygen Permeation Through Perovskite–Type Oxides", pp. 1743–1746, Chemistry Letters, Chem. Soc. Japan (1985), no month available.

Teraoka, Y. et al., Development of Oxygen Semipermeable Membrane Using Mixed Conductive Perovskite–Type Oxides (Part 1), pp. 458–462, vol. 97, Journal Ceramic Society Japan, INT. Ed. (1989), no month available.

Patent Abstract of Japan, vol. 12, No. 426 (C–542) 3273, Nov. 10, 1988, JP–A–63156515 (Matsushita Electric Ind. Co.) Jun. 29, 1988.

Patent Abstract of Japan, vol. 10, No. 117, May 2, 1986, p. 19 E400, JP–A–60,250,565 (Asahi Glass K.K.) Nov. 12, 1985.

Patent Abstract of Japan, vol. 10, No. 182 (C536–2238, Jun. 25, 1986, JP–A–61,030,688 (Idemitsu Kosan Co.), Feb. 12, 1986.

Patent Abstract of Japan, vol. 5, No. 75 (C–55), May 19, 1996, JP–A–56024020, (Teijin K.K.) Jul. 3, 1981.

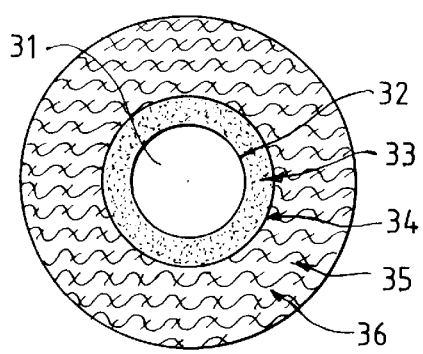
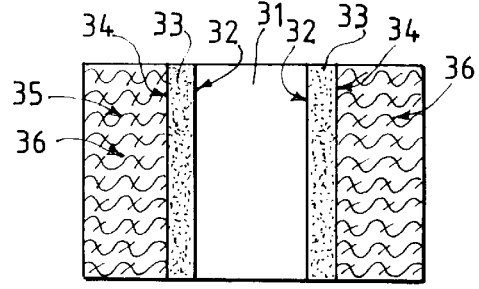
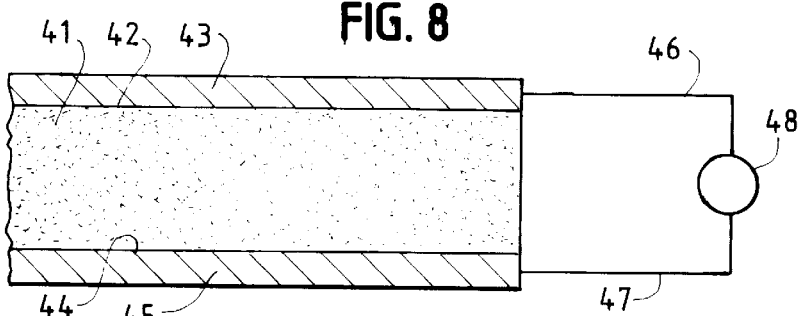
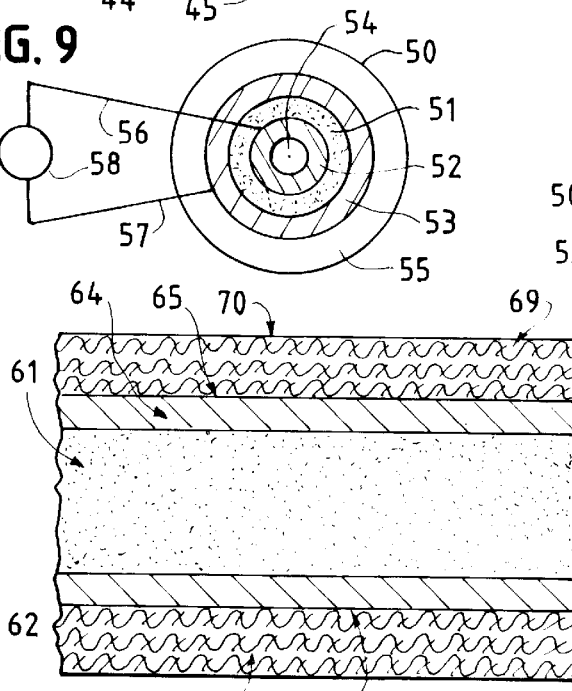
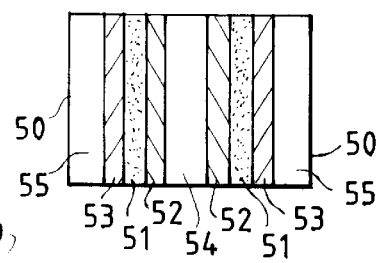
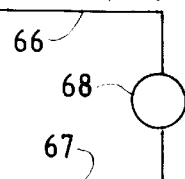
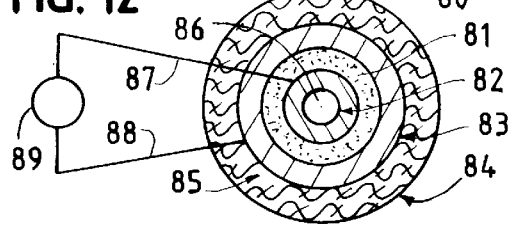
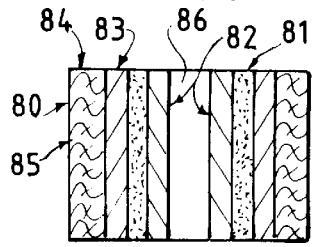

SOLID MULTI-COMPONENT MEMBRANES, ELECTROCHEMICAL REACTOR COMPONENTS, ELECTROCHEMICAL REACTORS AND USE OF MEMBRANES, REACTOR COMPONENTS, AND REACTOR FOR OXIDATION REACTIONS

CROSS-REFERENCE TO RELATED APPLICATIONS

This patent application is a divisional of application Ser. No. 08/394,925 filed Feb. 24, 1995, now U.S. Pat. No. 5,591,315. Application Ser. No. 08/394,925 is a continuation of application Ser. No. 08/228,793 filed Apr. 15, 1994, now abandoned, which was a divisional of application Ser. No. 07/618,792 filed Nov. 27, 1990, now U.S. Pat. No. 5,306,411. Application Ser. No. 07/618,792 is a continuation-in-part of U.S. patent application Ser. Nos. 07/457,327 filed on Dec. 27, 1989, now abandoned; 07/457,340 filed on Dec. 27, 1989, now abandoned, which is a continuation-in-part of U.S. patent application Ser. No. 07/025,511 filed on Mar. 13, 1987 and issued as U.S. Pat. No. 4,933,054 on Jun. 12, 1990; Ser. No. 07/457,384 filed on Dec. 27, 1989, now abandoned; and Ser. No. 07/510,296 filed on Apr. 16, 1990, now abandoned, which is a continuation-in-part of U.S. patent application Ser. No. 07/357,317 filed on May 25, 1989, now abandoned, which are hereby fully incorporated herein by reference.

TECHNICAL FIELD

This invention relates to the field of electrochemical reactors which facilitate the transfer of oxygen. In particular, this invention relates to oxygen semipermeable membranes, components for electrochemical reactors comprising the oxygen semipermeable membrane, electrochemical reactors and reactor components comprising the oxygen semipermeable membranes and optional catalyst, and electrochemical processes which use the oxygen semipermeable membrane and optional catalyst to facilitate electrochemical processes which utilize oxygen transport from an oxygen-containing gas to a gas that consumes oxygen.

BACKGROUND OF THE INVENTION

Synthesis gas is composed primarily of hydrogen and carbon monoxide. Generally the $H_2/CO$ molar ratio is from about 0.6 to 6. The production of synthesis gas from light hydrocarbons such as methane and natural gas by partial oxidation is known. The present invention describes an electrochemical reactor having a solid multicomponent membrane, which facilitates the electrocatalytic conversion of light hydrocarbons to synthesis gas.

Numerous publications describe conventional fuel cells which completely oxidize methane to carbon dioxide and water. These fuel cells are not designed to conduct chemical processes, but rather to generate electricity from fuel gas and air (or oxygen). The processes conducted in fuel cells are selected for complete combustion rather than partial combustion and require completion of an external electric circuit for oxidation of fuel gas to proceed.

Other uses for the electrochemical reactor of the present invention include the partial oxidation of hydrocarbons to form olefins, the partial oxidation of ethane, substitution of aromatic compounds, extraction of oxygen from one or more oxygen-containing gases such as $SO_2$, $SO_3$, $N_2O$, NO, $NO_2$, steam, $CO_2$, ammoxidation of methane, etc.

Dehydrogenation processes for the conversion of saturated organic compounds to unsaturated compounds are well known. Continued efforts have been made in recent years to improve such processes in order to improve the conversion rate and selectivity to desired products. The present invention describes a continuous process for dehydrogenation of saturated hydrocarbons such as ethane to ethylene and acetylene, and propane to propene and propyne. In this process of the present invention, water is a by-product, and electricity may be generated.

The commercial ethane dehydrogenation process, which is an equilibrium limited thermal reaction, must rely on the use of high reaction temperatures to obtain reasonable per pass yields of ethylene. As a result of the high temperatures required, rates of competing cracking and coking reactions are high enough to adversely affect product selectivities.

Conventional oxydehydrogenation processes, which are not inherently equilibrium limited, also suffer from poor product selectivities at high ethane conversions.

The present invention overcomes the disadvantages inherent in the prior art processes in order to achieve high conversion to unsaturated hydrocarbons combined with low rates of competing cracking and coking reactions.

Processes for the substitution of aromatic compounds are well known. Continued efforts have been made in recent years to improve such processes in order to improve the conversion rate and selectivity to desired products. The present invention describes a continuous process for the substitution of aromatic compounds such as benzene, with a second hydrogen-containing compound. In this process of the present invention, water is a by-product, and electricity can be generated.

Sulfur and nitrogen oxides, for example, are well known noxious pollutants in gas streams emanating from stationary and mobile sources such as power plants, automobiles, ships, trains, etc. Sulfur oxides are known to combine with water vapor to form a highly corrosive vapor causing irritation to eyes and mucous membrane, damage to metal-containing structures, and environmental harm to vegetation due to acid rain. Nitrogen oxides are toxic irritants and are also damaging to the environment. Carbonyl sulfide (COS) is another toxic pollutant formed as a product of a reaction between a sulfur-containing compound and carbon monoxide in a gas stream effluent. Regulations on the discharge of these pollutants into the atmosphere have become increasingly stringent. The present invention describes an electrocatalytic process and electrochemical cell for removing sulfur and nitrogen oxides from gas streams which utilize the chemical driving force of a fuel gas.

SUMMARY OF THE INVENTION

A solid multi-component membrane is described for use in the processes of the present invention. The solid multi-component membrane generally comprises intimate, gas-impervious, multi-phase mixtures of an electronically-conductive phase and an oxygen ion-conductive phase and/or gas impervious "single phase" mixed metal oxides having a perovskite structure and having both electron-conductive and oxygen ion-conductive properties. Solid multi-component membranes are also described for use in electrochemical reactors comprising the aforementioned multi-phase mixtures and/or the aforementioned mixed metal oxides, provided that the mixed metal oxides are represented by the formula:

wherein A represents a lanthanide or Y, or a mixture thereof; A' represents an alkaline earth metal or a mixture thereof; B represents Fe; B' represents Cr or Ti, or a mixture thereof; and B" represents Mn, Co, V, Ni or Cu, or a mixture thereof and s, t, u, v, w, and x each represent a number such that:

s/t equals from about 0.01 to about 100;

u equals from about 0.01 to about 1;

v equals from 0.01 to about 1;

w equals from zero to about 1;

x equals a number that satisfies the valences of the A, A', B, B' and B" in the formula; and $$0.9 < (s+t)/(u+v+w) < 1.1.$$

An element is described for use in the processes of the present invention having a first surface capable of reducing oxygen to oxygen ions, a second surface capable of reacting oxygen ions with an oxygen-consuming gas, an electron-conductive path between the first and second surfaces and an oxygen ion-conductive path between the first and second surfaces. The element may also comprise (1) a porous substrate, (2) an electron-conductive metal, metal oxide or mixture thereof and/or (3) a catalyst. The porous substrate (1); conductive coating (2); and/or (3) catalyst may be applied as separate materials or the functions of the porous substrate (1); conductive coating (2); and/or catalyst (3) may be combined in one or two materials Elements are described for use in an electrochemical reactor as defined above wherein the element comprises (1) a catalyst, such as a sulfur reducing catalyst at a surface thereof, or (2) (A) a solid multi-component membrane characterized by (1) an intimate, gas-impervious, multi-phase mixture of an electronically-conductive phase and an oxygen ion-conductive phase or (2) a mixed metal oxide material having a perovskite structure and (B) a conductive coating, a catalyst, or a conductive coating comprising a catalyst.

An electrochemical reactor cell for transporting oxygen from any oxygen containing gas to any gas that consumes oxygen is also described which generally comprises the aforementioned elements having an entrance end, an exit end and a passage therebetween for the movement of one or more gases from the entrance end to the exit end. In one embodiment, the passage between the entrance end and exit end may optionally comprise a catalyst, such as a discrete particle or fiber catalyst packed in the passage between the entrance end and the exit end of the reacter cell. This electrochemical reactor cell is placed in an environment containing ay oxygen-containing gas on one side and an oxygen-consuming gas on the other side under reaction conditions of appropriate temperature and percentage of respective gases.

An electrochemical reactor for reacting an oxygen-consuming gas with an oxygen-containing gas is also described comprising a shell having an entrance end, an exit end and a passage therebetween for the movement of one or more gases from the entrance end to the exit end and at least one of the aforementioned reactor cells positioned within the shell, so that the shell and the reactor cell together form a first zone for introducing, reacting and expelling a first gas or gas mixture and a second zone (i.e., the aforementioned reactor cell passage) within the reactor cell and separated from the first zone by the reactor cell for introducing, reacting and expelling a second gas or gas mixture. In one embodiment, the first zone and or second zone may optionally comprise a catalyst, such as discrete particle or fiber catalyst packed between the shell and the outer surface of the reactor cell or in the passage within the reactor cell.

Further included within the scope of the present invention is an eletrochemical process for oxidizing a reactant gas. The term "reactant gas" is defined herein as a gas which is capable of reacting with oxygen or oxygen ions.

One aspect of the present invention is an electrochemical process for oxidizing methane, natural gas or other light hydrocarbons to unsaturated hydrocarbons or synthesis gas. The electrochemical process generally comprises (A) providing an electrochemical cell comprising a first zone and a Second zone separated from the first zone by the element defined above, (B) heating the electrochemical cell to a temperature of from about 3000° C. to about 1400° C., (C) passing an oxygen-containing gas in contact with the element in the first zone, and (D) passing methane, natural gas or other light hydrocarbon in contact with the element in the second zone.

The above process may further comprise (E) recovering the product from the second zone.

When the present invention is an electrochemical process for oxidizing methane, natural gas or other light hydrocarbons to synthesis gas, the electrochemical process comprises (A) providing an electrochemical cell comprising a first zone and a second zone separated from the first zone by the element defined above, (B) heating the electrochemical cell to a temperature of from about 1000° C. to about 1400° C., (C) passing an oxygen-containing gas in contact with the element in the first zone, and (D) passing methane, natural gas or other light hydrocarbon in contact with the element in the second zone.

The above process may further comprise (E) recovering the synthesis gas from the second zone.

When the electrocatalytic process is for producing unsaturated hydrocarbon compounds from saturated hydrocarbon compounds, the process generally comprises the steps of (A) providing an electrochemical cell comprising an element having a first and second surface as defined above;

(B) passing an oxygen-containing gas in contact with the first surface while (C) passing a saturated hydrocarbon-containing gas in contact with a dehydrogenation catalyst adjacent to the second surface; and, optionally, (D) recovering unsaturated hydrocarbons.

When the present invention is an electrocatalytic process for reacting an aromatic compound with a second hydrogen-containing compound to form substituted aromatic compounds, this process comprises:

(A) providing an electrochemical cell comprising
(i) an element having a first and second surface as defined above,
(ii) a first passageway adjacent to the first surface, and
(iii) a second passageway adjacent to the second surface; and (B) passing an oxygen-containing gas through the first passageway while (C) passing an oxygen-consuming gas through the second passageway wherein the oxygen-consuming gas comprises a mixture of a hydrogen-containing aromatic compound and a second hydrogen-containing compound to produce the substituted aromatic compound.

In one embodiment, the second passageway of the electrochemical cell includes a catalyst distributed in the passageway or on the second surface, or both.

If it is desirable to recover the substituted aromatic compound, the above process may further comprise:

(D) recovering the substituted aromatic compound from the second passageway.

Another aspect of the present invention is an electrochemical process for extracting oxygen from an oxygen-containing gas which comprises (A) providing an electrochemical cell comprising a first zone and a second zone separated from the first zone by the element defined above, (B) passing an oxygen-containing gas in contact with the element in the first zone, and (C) passing a reactant gas in contact with the element in the second zone.

When the present invention is an electrochemical process for extracting oxygen from a gas containing oxygen other than as free oxygen such as $SO_2$, $SO_3$, $N_2O$, NO or $NO_2$, the electrochemical process comprises (A) providing an electrochemical cell comprising a first zone and a second zone separated from the first zone by the element defined above, (B) passing a as containing an oxygen-containing gas wherein oxygen is present in a form other than as free oxygen in contact with the element in the first zone, and (C) passing a reactant gas in contact with the element in the second zone.

This process may be used in a method for gas cleanup in which the gas containing oxygen other than as free oxygen is a flue or exhaust gas.

If a desirable product is obtained by the above oxygen extraction processes, such as synthesis gas, unsaturated hydrocarbons, elemental sulfur, or oxygen free gas, those processes may further comprise recovering the desired product from the zone in which it is produced. Oxygen-free gas may, for example, be recovered from the first zone.

When the present invention is an electrochemical process for oxidizing methane and ammonia to hydrogen cyanide, the electrochemical process comprises (A) providing an electrochemical cell comprising a first zone and a second zone separated from the first zone by the element defined above, (B) heating the electrochemical cell to a temperature of from about 1000° C. to about 1400° C., (C) passing an oxygen-containing gas in contact with the element in the first zone, and (D) passing methane and ammonia in contact with the element in the second zone.

The above process may further comprise (E) recovering hydrogen cyanide from the second zone.

BRIEF DESCRIPTION OF THE DRAWINGS

In the annexed drawings:

FIG. 6 is a top view, and cross-section, of a third embodiment of an electrochemical reactor useful for carrying out the processes of the invention.

FIG. 7 is a side view, and cross-section, of the reactor shown in FIG. 6.

FIG. 8 is a side view, and cross-section of an element suitable for carrying out the processes of this invention.

FIG. 9 is a top view, and cross-section of another electrochemical reactor useful for carrying out the processes of the invention.

FIG. 10 is a side view, and cross-section of the reactor shown in FIG. 9.

FIG. 11 is a side view and cross-section of yet another embodiment of the present invention suitable for carrying out the processes of this invention.

FIG. 12 is a top view and cross-section of another electrochemical reactor useful for carrying out the processes of the invention.

FIG. 13 is a side view and cross-section of the reactor shown in FIG. 12.

DESCRIPTION OF THE PREFERRED EMBODIMENTS

This invention provides an electrochemical reactor for a continuous process for transporting oxygen from any oxygen-containing gas to any reactant gas that consumes oxygen. Processes which may be conducted with the present invention are, for example, the combustion of hydrogen to produce water, the partial oxidation of methane or natural gas to produce synthesis gas, the partial oxidation of methane and saturated hydrocarbon-containing gases to produce unsaturated hydrocarbons, the partial oxidation of ethane, substitution of aromatic compounds, extraction of oxygen from oxygen-containing gases (e.g., extraction of oxygen from $NO_{x'}$, wherein x' has a value from 0.5 to 2, $SO_y$, wherein y has a value from 2 to 3, steam, $CO_2$, etc.), ammoxidation of methane to hydrogen cyanide, etc.

Figure 1:
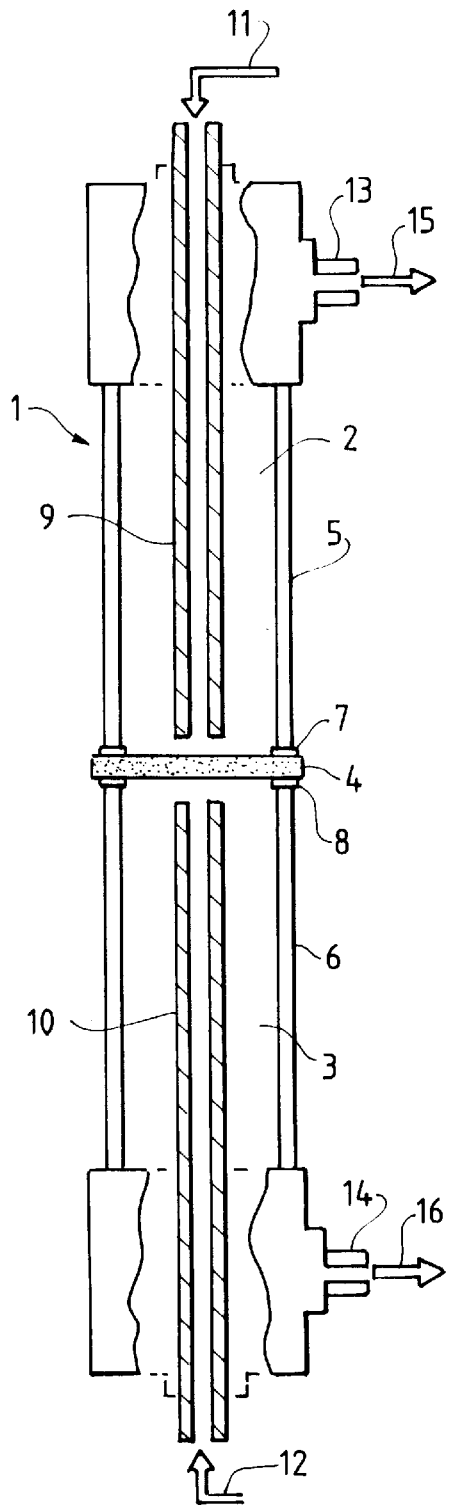
FIG. 1 is a side view, and cross-section of a first embodiment of an electrochemical reactor of the present invention.

One embodiment of the electrochemical reactor of the present invention may be schematically represented as shown in FIG. 1, wherein the side view, and cross-section of the reactor 1 shows a first zone 2 separated from a second zone 3 by element 4. The outer perimeter of the first zone is defined by reactor tube 5 and the outer perimeter of the second zone is defined by reactor tube 6. Reactor tubes 5 and 6 form a gas-tight seal with element 4 by means of glass seals 7 and 8, respectively. Feed tubes 9 and 10 conduct the oxygen-containing gas 11 and oxygen-consuming gas 12 into zones 2 and 3, respectively. Exit ports 13 and 14 permit reacted gases 15 and 16 to escape zones 2 and 3, respectively.

In practice, an oxygen-containing gas or gas mixture, such as air, is passed in contact with the element in the first zone, and the oxygen-consuming gas or gas mixture, such as a reactant gas-containing feed gas, is passed in contact with the element in the second zone. As the oxygen-containing gas or gas mixture contacts the element, oxygen is reduced to oxygen ions which are transported through the element 4 to the surface facing the second zone. At the second zone, the oxygen ions react with the oxygen-consuming gas or gas mixture, oxidizing the oxygen-consuming gas and releasing electrons. The electrons return to the surface facing the first zone via element 4.

In one embodiment, the oxygen-consuming gas is methane or natural gas, and the oxygen-containing a gas or gas mixture is air. As air contacts the element, the oxygen component of air is reduced to oxygen ions which are transported through the element to the second zone where the oxygen ions react with the methane to produce synthesis gas or olefins, depending on the reaction conditions.

In another embodiment, the oxygen-consuming gas is methane, natural gas, or hydrogen and the oxygen-containing gas is a flue or exhaust gas containing $NO_{x'}$ and/or $SO_y$, wherein x' and y are defined as above. As the flue gas contacts the element, the oxygen of $NO_{x'}$ and/or $SO_y$ is reduced to oxygen ions which are transported through the element to the second zone where the oxygen ions react with the oxygen-consuming gas to produce carbon dioxide and water, synthesis gas or olefins, depending on the reaction conditions. In one embodiment, nitrogen gas and elemental sulfur are electrochemically produced from $NO_{x'}$ and $SO_y$, respectively, in the first zone.

In yet another embodiment of the present invention, the oxygen-containing gas is a gas containing steam (i.e., $H_2O$ gas). As $H_2O$ contacts the element, the oxygen of $H_2O$ is reduced to oxygen ions which are transported through the element to the second zone where the oxygen ions react with methane or natural gas, for example. The $H_2O$ is reduced to hydrogen gas ($H_2$) in the first zone. The hydrogen gas may be recovered and used, for example, to hydrogenate unsaturated hydrocarbons, provide fuel for an electrical current generating fuel cell, to provide fuel for heating the electrochemical cell of this invention or to provide a reactant gas for the electrochemical process for extracting oxygen from an oxygen-containing gas in accordance with the present invention.

Materials which are copresent may participate in electrochemical reduction or oxidation taking place at the element of the present invention. When, for example, methane is present with ammonia in the second zone and an oxygen-containing gas is present in the first zone, hydrogen cyanide and water may be produced electrochemically in the second zone.

Other combinations of materials reactive with each other to produce a wide range of products are possible and are contemplated as being within the scope of the present invention.

The terms "oxygen-consuming gas", "reactant gas" and "oxygen-containing gas" herein include materials which are not gases at temperatures below the temperature ranges of the pertinent process of the present invention, and may include materials which are liquid or solid at room temperature. An example of an oxygen-containing gas which is liquid at room temperature is steam.

Multi-Component Membrane

As mentioned above, the solid multi-component membrane used in the electrochemical reactor of the present invention may be an intimate, gas-impervious, multi-phase mixture of any electronically-conducting material with any oxygen ion-conducting material and/or a gas impervious "single phase" mixed metal oxide having a perovskite structure and having both electron-conductive and oxygen ion-conductive properties. The phrase "gas-impervious" is defined herein to mean "substantially gas-impervious or gas-tight" in that the mixture does not permit a substantial amount of the above-described oxygen-consuming or oxygen-containing gas to pass through the mixture as a gas (i.e., the mixture is non-porous, rather than porous, with respect to the relevant gases). In some cases, a minor degree of perviosness to gases might be acceptable or unavoidable, such as when hydrogen gas is present.

The term "mixtures" in relation to the solid multi-component membrane includes materials comprised of two or more solid phases, and single-phase materials in which the atoms of the various elements are intermingled in the same solid phase, such as in the yttria-stabilized zirconia mentioned below. The examples of preferred metal-doped metal oxides are single-phase materials whereas the phrase "multi-phase mixture" refers to a composition which contains two or more solid phases interspersed without forming a single phase solution.

In other words, the multi-phase mixture is "multi-phase", because the electronically-conductive material and the oxygen ion-conductive material are present as at least two solid phases in the gas impervious solid membrane, such that the atoms of the various components of the multi-component membrane are, for the most part, not intermingled in the same solid phase.

(1) Multi-Phase

The multi-phase solid membrane of the present invention differs substantially from "doped" materials known in the art. A typical doping procedure involves adding small amounts of an element, or its oxide (i.e., dopant), to a large amount of a composition (i.e., host material), such that the atoms of the dopant become permanently intermingled with the atoms of the host material during the doping process, whereby the material forms a single phase. The multi-phase solid membrane of the present invention, on the other hand, comprises an oxygen ion conductive material and an electronically conductive material that are not present in the dopant/host material relationship described above, but are present in substantially discrete phases. Hence, the solid membrane of the present invention, rather than being a doped material, may be referred to as a two-phase, dual-conductor, multi-phase, or multi-component membrane.

The multi-phase membrane of the present invention can be distinguished from the doped materials by such routine procedures as electron microscopy, X-ray diffraction analysis, X-ray adsorption mapping, electron diffraction analysis, infrared analysis, etc., which can detect differences in composition over a multi-phase region of the membrane. An example of such physical evidence of multiphase composition is the electron photomicrographs shown as FIG. 4 and FIG. 5. A detailed explanation of FIG. 4 and FIG. 5 follows Examples 1–5 below.

Typically, the oxygen ion-conducting materials or phases are solid solutions (i.e., solid "electrolytes") formed between oxides containing divalent and trivalent cations such as calcium oxide, scandium oxide, yttrium oxide, lanthanum oxide, etc., with oxides containing tetravalent cations such as zirconia, thoria and ceria or the oxygen ion-conducting materials or phases comprise an oxygen ion-conductive mixed metal oxide of a perovskite structure. Their higher ionic conductivity is believed to be due to the existence of oxygen ion site vacancies. One oxygen ion vacancy occurs for each divalent or each two trivalent cations that are substituted for a tetravalent ion in the lattice. Any of a large number of oxides such as yttria stabilized zirconia, doped ceria, thoria-based materials, or doped bismuth oxides may be used. Some of the known solid oxide transfer materials include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, $Y_2O_3$-stabilized $CeO_2$, CaO-stabilized $CeO_2$, $ThO_2$, $Y_2O_3$-stabilized $ThO_2$, or $ThO_2$, $ZrO2$, $Bi_2O_3$, $CeO_2$, or $HfO_2$ stabilized by addition of any one of the lanthanide oxides or CaO. Many other oxides are known which have demonstrated oxygen ion-conducting ability which could be used in the multi-phase mixtures, and they are included in the present concept.

Preferred among these solid electrolytes are the $Y_2O_3$-(yttria) and CaO-(calcia) stabilized $ZrO_2$ (zirconia) materials. These two solid electrolytes are characterized by their high ionic conductivity, their oxygen ion conduction over wide ranges of temperature and oxygen pressure, and their relatively low cost.

In addition, the inventors have found that mixed metal oxides having a perovskite structure (at operating temperatures) can have very good oxygen ion conductivity. The term "perovskites" refers to a class of materials which have a structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of the cube's edges. This is referred to as an $ABO_3$-type structure, in which A and B represent metal ions.

In general, perovskite structures require that the sum of the valences of A and B ions be 6, and the relationship between the radii of the ions in an $ABO_3$ structure containing two metal ions may be expressed by the formula $$r_A + r_O = \frac{t}{2(r_B + r_O)} \qquad (I)$$

wherein $r_A$, $r_B$ and $r_C$ are the radii of the A ions, B ions and oxygen ions, respectively, and t is a "tolerance factor" which may lie within the approximate range of 0.7–1.0. In general, compounds having the perovskite structure have A ions with a radius of between about 1.0 to about 1.4 angstrom and 3 ions with a radius of between about 0.45 to about 0.75 angstrom. The inventors find generally that when mixed metal oxides of a perovskite structure contain A ions having radii approaching the low end of the A ion radius range for a given B ion as determined by the above formula, then oxygen ion conductivity generally increases. This trend toward increased oxygen ion conductivity can, however, be limited by greater instability of the perovskite structure at operating temperatures as A ion radii approach the lower limit of the desired radii for perovskites having a given B ion.

A wide variety of metals and oxides of metals may be used to form perovskites useful in the present invention. In general, any combination of metals which satisfy the requirements of a perovskite may be used. Typical examples of such metals are the lanthanides, the metals of Groups Ia and IIa, the: transition metals Al, Ga, Ge, etc. Examples of preferred metals include La, Co, Sr, Ca, Fe, Cu, Ni, Mn, Cr, Y, Ba, Ti, Ce, Al, Sm, Pr, Nd, V, Gd, Ru, Pb, Na, W, Sc, Hf, Zr, oxides thereof, and mixtures thereof. Bi and/or Ce are typically not required in the preferred embodiments, but may be present if desired. In one embodiment, Bi and/or Ce are present in amounts less than 13 mol %.

Preferred examples of A metals in the $ABO_3$-type materials useful in the present invention include the lanthanides (La, Ce, Pr, Nd, Pm, Sm, Eu, Gd, Tb, Dy, Ho, Er, Tm, Yb, and Lu), yttrium and the alkaline earth metals, particularly Mg, Ca, Sr, and Ba.

Preferred B metals in the $ABO_3$ materials for the present invention include the first row of transition metals, namely Sc, Ti, V, Cr, Mn, Fe, Co, Ni, Cu, and Zn. Among these metals, Co, Mn, Fe and Cr are more preferred.

The perovskite structure is tolerant of a wide variety of multiple cation substitutions on both the A and B sites, so that a variety of more complex perovskite compounds containing a mixture of A metals and B metals are useful for this invention. Perovskite materials containing more than two metals besides oxygen are preferred Increased oxygen ion conductivity may be achieved by using a mixture of metals as the A ions that have such stable oxidation states which are different such as when some A ions are stable in the +3 oxidation state and others are stable in the +2 oxidation state at the operating temperature of the process in which the membrane is utilized. Although the inventors do not wish to be bound by any particular theory, it is believed that the presence of metal ions in a lower stable oxidation state among metal ions in a higher stable oxidation state creates oxygen ion vacancies in the ionic lattice which facilitate migration of oxygen ions through the perovskite material.

The inventors have also discovered that the presence of chromium and/or titanium in the B sites of the perovskite ionic lattice may be used to increase the stability of the perovskite structure under the conditions of electrocatalytic processes, and with chromium they observe increasing electron conductivity as further described below.

Preferred mixed metal oxides having a perovskite structure may be represented by the formula:

$$A_s A'_t B_u B'_v B''_w O_x \qquad (II)$$

wherein A represents a first A ion, A' represents a second A ion, B represents a first B ion, B' represents a second B ion, B" represents a third B ion and s, t, u, v, w and x each represent a number such that:

s/t equals from about 0.01 to about 100, preferably from about 0.1 to about 20;

u equals from 0.01 to about 1, preferably from about 0.5 to about 1;

v equals from 0.01 to about 1, preferably from about 0.05 to about 0.5;

w equals from zero to about 1, preferably from about 0.01 to about 0.5;

x is a number that satisfies the valencies of the other elements present in formula (II); and 0.9<(s+t)/(u+v+w)<1.1, preferably 0.99<(s+t)/(u+v+w) <1.01.

In one embodiment, A represents a lanthanide or Y, or a mixture thereof; A' represents an alkaline earth metal or a mixture thereof; B represents Fe; B' represents Cr or Ti, or a mixture thereof; and/or B" represents Mn, Co, V, Ni or Cu, or a mixture thereof in which u, and optionally w, are greater than zero. In a preferred embodiment, A represents La or Y, or a mixture thereof; A' represents Ca or Sr, or a mixture thereof; B represents Fe; B' represents Cr; and/or B" represents Mn or Co, or a mixture thereof. Minor amounts of other elements may be present, such as those present as impurities.

Examples of mixed metal oxides having a perovskite structure which are useful as solid oxygen ion-conductive electrolyte in the present invention include lanthanum-strontium cobaltite, lanthanum-strontium ferrite, lanthanum-strontium-iron chromite, lanthanum-strontium-iron-chromium cobaltite, lanthanum-strontium-iron-chromium manganite, lanthanum-strontium manganite, lanthanum-calcium cobaltite, lanthaium-calcium-iron chromite, lanthanum-calcium-iron-chromium cobaltite, lanthanum-calcium-iron-chromium manganite, lanthanum-calcium manganite, yttrium-strontium ferrite, yttrium-strontium cobaltite, yttrium-strontium-iron chromite, yttrium-strontium-iron-chromium cobaltite, yttrium-strontium-iron-chromium manganite, yttrium-strontium manganite, strontium-cobalt ferrite, strontium-iron cobaltite, gadolinium-strontium cobaltite, etc., and mixtures thereof. Specific examples are $La_aSr_bCoO_x$, $La_aSr_bFeO_x$, $La_aCa_bCoO_x$, $SrCo_aFe_bO_x$, $Gd_aSr_bCoO_x$, etc., wherein a, b, and x are numbers, the sum of a and b equals 1, and x is defined the same as in formula (II) above. The molar ratio between the respective metals represented by a:b may cover a wide range. Typical doping ratios of a:b are 4:1, 3:1, 1:4, 1:3, etc.

The electronically-conducting material or phase of the membrane can be any material which exhibits sufficient electronic conductivity under the conditions of the reaction. Typically, the electronically-conducting phase is comprised of one or more metals or metal oxides which display appreciable electronic conductivity at reaction temperatures. Suitable metals include silver, gold, platinum, rhodium, ruthenium, palladium, nickel, cobalt, copper, etc., among which palladium and platinum are preferred. Examples of suitable metal oxides include bismuth oxides, tin-indium oxide mixtures, praseodymium-indium oxide mixtures, cerium-lanthanum oxide mixtures, niobium-titanium oxide mixtures, electron-conductive mixed metal oxides of a perovskite structure, etc., among which the metal-doped metal oxides, such as praseodymium-doped indium oxides, tin-doped indium oxides, cerium-doped lanthanum oxides, niobium-doped titanium oxide mixtures, electron-conductive mixed metal oxides of a perovskite structure including the electron-conductive perovskites described above in connection with perovskites suitable as the oxygen ion-conductive component, etc., are preferred. Among the metal-doped metal oxides, praseodymium-doped indium oxides and the mixed metal oxided, are the most preferred.

In many $ABO_3$-type mixed metal oxide compounds, the actual structure is a continuum of a pseudosymmetric variant derived from the perfectly symmetrical simple cubic structure by small displacements of the ions. In some cases these displacements result in a slight distortion of the unit cell, the symmetry of which is accordingly reduced to tetragonal or orthorhombic, and in others the deformation is such that adjacent cells are no longer precisely identical so that the true unit cell comprises more than one of the smaller units. The ferroelectric properties of many of these oxides are due to such departures from an ideal structure.

Electron-conductivity of mixed metal oxides having a perovskite structure generally increases when the A ion is partially substituted, or "doped", with a divalent metallic cation, such as Ba, Ca, or Sr. This trend toward greater electron-conductivity is often accompanied by greater instability at operating temperatures. Perovskites partially decomposed into a different structure might have electron conductivity which differs substantially from that of the original perovskite structure.

As mentioned above, the inventors have discovered that the presence of chromium and/or titanium at the B sites of the perovskite ionic lattice increases the stability of the perovskite structure, and that the presence of chromium has the additional benefit of increasing electronic conductivity even though chromium is in the +4 oxidation state.

Although the inventors do not wish to be bound by a particular theory of why the presence of certain metal ions increases electron conductivity, the inventors have found that the presence of metal ions that are capable of changing from one oxidation state to another without requiring a high redox potential generally increase electron conductivity. Examples other than chromium include iron, cobalt, and manganese.

Specific examples of mixed metal oxide materials include lanthanum-strontium manganite, lanthanum-strontium cobaltite, lanthanum-strontium-iron chromite, lanthanum-strontium-iron-chromium cobaltite, lanthanum-strontium-iron-chromium manganite, lanthanum-calcium-iron-chromite, lanthanum-calcium-iron-chromium cobaltite, lanthanum-calcium-iron-chromium manganite, lanthanum-magnesium chromite, lanthanum-chromium ferrite, lanthanum cobaltite, yttrium-strontium-iron chromite, yttrium-strontium-iron-chromium cobaltite, yttrium-strontium-iron-chromium manganite, yttrium-barium cuprite (e.g., $YBa_2Cu_3O_x$ wherein x is defined the same as in formula (II) above, etc., and mixtures thereof.

Useful $ABO_3$-type compounds and how to make them are described in Dow-Chemical company's PCT Application No. 89085506, published on Mar. 9, 1989 under Publication No. WO 89/01922; Muller and Roy, "The Major Ternary Structural Families", pp. 175–201 (1974); Lines, M. E. and Glass, A. M., "Principles and Applications of Ferroelectrics and Related Materials"; pp. 280–92 and Appendix F, pp. 620–32 (Clarendon Press), Oxford (1977); and Evans, R. D., "An Introduction to Crystal Chemistry", Cambridge Univ. Press., Cambridge, 2nd ed. (1964), pp. 167–71. Each of these references is hereby incorporated by reference for their disclosure relating to perovskites.

These multi-phase multi-component membranes may contain from about 1 to about 75 parts by volume of an electron-conductive material and from about 25 to about 99 parts by volume of an oxygen ion-conductive material. The elements Bi, Ce, and Ti, individually or collectively, may be excluded in the preferred embodiments.

The multi-phase multi-component membranes may be fabricated by combining at least one of the electronically-conducting materials with at least one of the oxygen ion-conducting materials and shaping the combined materials to form a dense, gas-tight, multi-phase solid membrane. In particular, the solid membrane may be prepared by a process which comprises the steps of (A) preparing an intimate mixture of at least one material which is electronically-conductive and at least one oxygen ion-conductive material, (B) forming the mixture into a desired shape, and (C) heating the formed mixture to a temperature of at least about 5000° C. to form a dense and solid membrane.

The solid membrane may also be prepared from at least one metal oxide, the metal of which is electronically-conductive, by a process which comprises the steps of (A) preparing an intimate mixture of at least one metal oxide, the metal of which is electronically-conductive, and at least one oxygen ion-conductive material, (B) heating the mixture at an elevated temperature in a reducing atmosphere to reduce the metal oxide to metal, (C) forming the reduced mixture into a desired shape, and (D) heating the formed mixture to a temperature of at least about 500° C. to form a dense and solid membrane.

(2) Single-phase Mixed Metal Oxide

As mentioned above, the solid multi-component membrane used in the electrochemical reactor of the present invention may, as an alternative to a multi-phase multi-component membrane or in addition to the multi-phase material, comprise a gas impervious "single phase" mixed metal oxides having a perovskite structure and having both electron-conductive and oxygen ion-conductive properties. Many of the aforedescribed perovskite-type materials are suitable for this aspect of the present invention. Specific examples of perovskite materials which are useful include, but are not limited to, the following materials:

$LaCoO_x$;

$La_{0.6}Sr_{0.4}CoO_x$;

$La_{0.2}Sr_{0.8}CoO_x$;

$YCoO_x$;
$YBa_2Cu_3O_x$
wherein x is a defined as in formula (II) above, etc.

The above-described mixed metal oxides represented by the formula $A_sA'_tB_uB'_vB''_wO_x$ (formula II) are well suited for use as a single phase mixed metal oxide membrane of the present invention, because they have the advantage of stability under electrocatalytic conditions as well as electron- and oxygen ion-conductivity. The preferred embodiments of formula I set forth above apply to this aspect of the present invention as well.

Mixtures of perovskites with additional conductive metal or metal oxide are also useful in preparing the multi-component membrane used in the present invention. The additional conductive metal or metal oxide may be the same as, or different from, the elements present in the perovskite. The additional conductive metal or metal oxide has been found to form a separate phase from the perovskite material upon heating, providing additional conductive materials through the perovskite to form electron-conductive pathways through the membrane. In a preferred embodiment, the multi-component membrane comprises a mixture of a perovskite, such as lanthanum cobaltite, lanthanum-strontium cobaltite, and an excess of a conductive metal or metal oxide, such as an excess of cobalt metal in a cobalt-containing perovskite.

In another embodiment, the multi-component membrane comprises a mixture of two or more perovskites, each perovskite having advantages in electron-conductivity or oxygen ion-conductivity, and may include additional conductive metal or metal oxide as discussed above.

A variety of powder preparation methods may be used to prepare a solid membrane having electron-conductive and oxygen ion-conductive properties such as the above-described perovskites. Suitable methods include (a) preparation from oxides, (b) thermal decomposition of nitrates and/or acetates, and (c) a citric acid preparation method.

(a) Preparation from Oxides Method

As one example, the solid membrane may be prepared from the oxides by a process which comprises the steps of:

(A) preparing perovskite powder containing the above-described A and B metals, (B) forming the mixture into a desired shape, and (C) heating the formed mixture to a temperature sufficient to form a dense and solid membrane having electron-conductive and oxygen ion-conductive properties. Typically, the temperature for this step is at least about 500° C., and is generally at least about 1,000° C.

(b) Preparation by Thermal Decomposition of Nitrates and/or Acetates

Preparation of mixed metal oxide compositions by thermal decomposition of nitrates and/or acetates comprises the steps of:

(A) dissolving nitrate and/or acetate salts of the desired elements in a polar solvent such as water, (B) heating the solution obtained in step (A) to remove the polar solvent until a solid powder is obtained, (C) heating the dried solid to a temperature sufficient to decompose the nitrate and/or acetate salts, (D) forming the mixture into a desired shape, and (E) heating the formed mixture to a temperature sufficient to form a dense and solid membrane having electron-conductive and oxygen ion-conductive properties. Generally, the temperature for steps (C) and (E) is at least about 500° C., step (C) is typically conducted at a temperature of at least about 900° C. and step (E) is typically conducted at a temperature of at least about 1000° C.

(c) Preparation by a Citric Acid Preparation Method

Preparation according to the citric acid preparation method includes (A) mixing nitrate and/or acetate salts of the desired elements in a polar solvent, such as water, containing citric acid in solution, (B) heating the mixture to an elevated temperature to form a solid powder, (C) forming the mixture into a desired shape, and (D) heating the formed mixture to a temperature sufficient to form a dense and solid membrane having electron-conductive and oxygen ion-conductive properties. Again, typically, the temperature for this step is at least about 500° C., and is generally at least about 1000° C.

In the above processes for making the multi-component membrane, a binding agent is generally added to the mixture prior to the final heating step to aid in binding the metal and/or metal oxide particles to form a desired shape. The agent is preferably a material which does not interfere with the formation of a dense and solid membrane in the final step of heating the formed mixture to a temperature of at least 500° C. and is capable of being easily dispersed in the mixture. Such a binding agent may, for example, be a wax or paraffinic hydrocarbon dispersed or dissolved in an appropriate solvent. A specific example of a binding agent is Carbowax 20™ (Supelco) dissolved in sufficient chloroform to distribute a binding amount of wax on the electronically-conductive and oxygen ion-conductive particles.

Modification and/or additional formation of perovskite structures may occur under reaction conditions in the reactor cell comprising the mixed metal oxides of perovskite structure.

The Element

The "element" referred to above preferably comprises:

(A-1) a solid electrolyte having a first surface coated with metal, metal oxide or a mixture thereof capable of reducing oxygen to oxygen ions and a second surface coated with metal, metal oxide or mixtures thereof capable of reacting oxygen ions with an oxygen-consuming gas, provided that both coatings are stable and electron-conductive at operating temperature and are connected to an external electron-conductive circuit.

(A-2) a solid multi-component membrane having a first surface and a second surface and comprising an intimate, gas-impervious, multi-phase mixture of an electronically-condutive phase and an oxygen ion-conductive phase.

Element (A-1) is described in further detail below.

The solid electrolytes of (A-1) can be any material which is stable and can transfer oxygen ions under operating conditions, especially at temperatures above 300° C. Preferably, the solid electrolyte is selected from among the oxygen ion-conductive materials described above in connection with the multi-component membranes of the present invention. Preferably the solid electrolyte is a substantially non-porous gas-impervious solid.

Preferred solid electrolytes are the $Y_2O_3$-(yttria) and CaO-(calcia) stabilized $ZrO_2$ (zirconia) materials and electrolytes having the perovskite structure. These solid electrolytes are characterized by their high ionic conductivity, their oxygen ion conductivity over wide ranges of temperature and oxygen pressure, and their relatively low cost.

The conductive coating on the cathode side may be any material capable of facilitating reduction of oxygen to oxygen ions by supplying electrons at the cathode surface and which is stable under the operating conditions. Examples of metals and metal oxides useful in the preparation of the cathode include silver, platinum, nickel, gold, bismuth, palladium, copper, cobalt, chromium, iron, niobium-titanium, lanthanum-manganese mixtures, indium-tin oxide mixtures, praseodymium-indium oxide mixtures, combinations of any two metals or metal oxides used to prepare the above-described perovskites, electron-conductive perovskites, and mixtures of said metals, metal oxides and combinations used to prepare perovskites.

The conductive coating on the anode side can be any of a wide variety of conductive materials capable of facilitating the reaction of oxygen ions with an oxygen-consuming gas, provided that the material is also stable under the operating conditions. Examples of metals and metal oxides useful in forming the anode coating include the materials described above as useful in preparing the cathode, but more particularly include silver, gold, nickel, bismuth, manganese, vanadium, platinum, rhodium, ruthenium, palladium, copper, zinc, cobalt, chromium, and iron metals and metal oxides, any mixtures of said metals and metal oxides, and other mixtures such as silver-bismuth oxide mixtures, tin-indium oxide mixtures, praeseodymiumindium oxide mixtures, cerium-lanthanum oxide mixtures, etc., and mixtures thereof. Among these, silver, gold, and mixtures of silver and gold are preferred.

Each conductive coating may be present as a thin film and/or as a porous conductive coating. The conductive coating is preferably porous. The porous conductive coating can provide advantages in increasing the contact area between the membrane or coated electrolyte and the gas(es) to be treated, thereby increasing the rate of electrocatalysis. The electrochemical reaction rate can be accelerated by impressing an electrical potential on this external circuit to increase the flow of electrons in the direction of the conductive surface in contact with the oxygen-containing gas. When the conductive coating comprises a catalyst, the rate of the electrochemical process may be increased even more.

The element may further comprise a porous substrate (1). The porous substrate (1) is porous to the reactant or product gases and functions as a support for the solid electrolyte having conductive coatings (A-1) and/or the solid multi-component membrane (A-2). It may be any material which achieves the desired objective as long as it does not interfere with the reaction process under reaction conditions. Any of a large number of oxides, including yttriastabilized zirconia, doped ceria, thoria-based materials, or doped bismuth oxides mentioned as oxygen-conducting materials and various other metal oxides may be used. Examples include CaO-stabilized $ZrO_2$; $Y_2O_3$-stabilized $ZrO_2$; $Sc_2O_3$-stabilized $ZrO_2$; $Y_2O_3$-stabilized $Bi_2O_3$; $Y_2O_3$-stabilized $CeO_2$; CaO-stabilized $CeO_2$; $ThO_2$; $Y_2O_3$-stabilized $ThO_2$; $ThO_2$, $ZrO_2$, $Bi_2O_3$, $CeO_2$ or $HfO_2$ stabilized by the addition of any one of the lanthanide oxides or CaO; $Al_2O_3$; etc.

The solid electrolyte having conductive coatings (A-1) and multi-component membranes (A-2) may be applied to a supporting substrate by any technique such as vapor deposition onto a porous substrate, impregnating a porous substrate, co-impregnating a porous support substrate, or any other technique commonly used to prepare ceramics. Alternatively, such elements may be prepared by tape casting of a slurry mixture, slip-casting, or other techniques. Another technique is heat treating the formed coated solid electrolyte or membrane precursor to form a stable structure, or until it is gas-tight, and attaching the resulting coated solid electrolyte or membrane to a support structure and further heat treating to achieve the finished, supported coated solid electrolyte or membrane. Other techniques are possible so long as the supporting substrate permits an oxygen-containing gas and an oxygen-consuming gas to come into contact with the coated solid electrolyte or membrane of the present invention.

Figure 2:
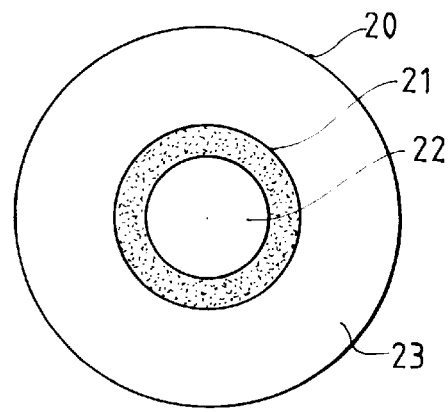
FIG. 2 is a top view, and cross-section of a second embodiment of an electrochemical reactor of the present invention.
Figure 3:
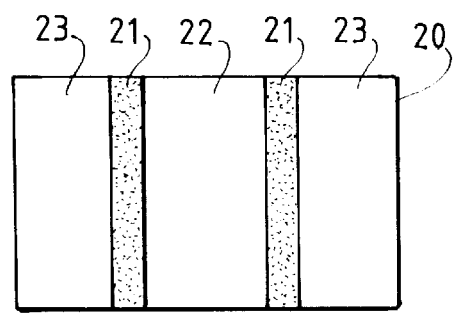
FIG. 3 is a side view, and cross-section of the reactor shown in FIG. 2.

The present invention may further be exemplified by reference to FIGS. 2 and 3 which illustrate an embodiment of an electrochemical reactor of the invention. FIG. 2 is a top view of an electrochemical reactor of the present invention different from the electrochemical reactor shown in FIG. 1, and FIG. 3 is a side view, and a cross-section, of the same reactor as that shown in FIG. 2. In both FIGS. 2 and 3, the electrochemical reactor comprises a shell 20 in which is placed a circular solid cylindrical reactor cell or core 21 comprising a solid multi-component membrane. As can be seen from the construction illustrated in FIGS. 2 and 3, the reactor contains an inner passage 22 within the core 21 traversing the entire length of the core 21 and an outer passage 23 between the outside surface of the core 21 and the inside surface of the shell 20.

In practice, the processes of the present invention are conducted with an apparatus such as illustrated in FIGS. 2 and 3 by passing, for example, an oxygen-consuming gas through the inner passage 22 and an oxygen-containing gas through the outer passage 23. The oxygen-containing gas which contacts the outside surface of the dual-conductor core 21 is converted to oxygen ions which migrate through the solid core 21 to the inside surface of the core 21. At the inside surface of the core 21, the oxygen ions react with the oxygen-consuming gas contacting the inside surface. During this reaction, each oxygen ion loses two electrons which travel from the inside surface of the core 21 to the outside surface of the core 21.

The above process can, of course, be reversed by passing an oxygen-containing gas through the inner passage 22 and an oxygen-consuming gas through the outer passage 23. Oxygen ions then migrate through the solid core 21 to the outside surface of the core 21 and electrons travel to the inside surface.

Typically for a process in which synthesis gas is made, one or more light hydrocarbons are in the inner passage 22, and if the element comprises a porous support for the membrane of solid core 21, the porous support normally is on the outside surface of the membrane. However, the decision as to which zones to use for the oxygen-consuming gas and the oxygen-containing gas, and the location of a porous support, if any, will depend on which arrangement is most suitable for the particular application of the present invention. Determination of the most appropriate arrangement is well within the ability of one of ordinary skill to determine without undue experimentation.

Perovskite and multi-phase membranes of the element also have varying degrees of stability with regard to the presence of a reducing gas and other reactive gas components. Since the process of the present invention exposes the membrane surface to such reactive components, it may be desirable to protect the surface of the multi-component membrane by formulating the surface of the membrane, or coating the membrane, with metal, metal oxide, or perovskite which has stability towards the gas in which it will be in contact when in use. The inventors have discovered that making the final layer of a perovskite or multi-phase multi-component membrane a layer which contains a lanthanide and chromium, for example, would be one way to help preserve the stability of the surface exposed to a reactive gas such as a reducing gas or a corrosive gas containing oxides of sulfur and nitrogen.

In one embodiment, the element comprises a multicomponent membrane coated on one or both sides with conductive metal, metal oxide or mixture thereof (2). Each conductive coating may be present as a thin film and/or as a porous coating as described above in connection with the element comprising (A-1). When such an element comprises a first surface coated with a conductive metal, metal oxide or mixture thereof capable of facilitating the reduction of oxygen to oxygen ions and a second surface also coated with a conductive metal, metal oxide or mixture thereof, the first and second conductive coatings may be connected by an optional external circuit as in (A-1) above for facilitating the transfer of electrons from the second conductive surface to the first conductive surface. The conductive coatings may comprise a catalyst and an electrical potential may be impressed upon this external circuit to increase the electrochemical reaction rate even more as in (A-1) above.

An element of the present invention is schematically represented in FIG. 8 wherein a core 41 comprising a multi-component membrane or a solid electrolyte is coated on one surface 42 with a material 43 useful for reducing oxygen to oxygen ions. This coating provides the cathode side of the cell. On a second surface 44 of the core 41 is another coating or material 45. This coating is the anode. The two coatings may optionally be connected by an external circuit through wire leads 46 and 47. When the core does not comprise an electrically conductive material, the external circuit is required. An ammeter 48 may be included in the circuit. A battery may also be included in the circuit for applying an electric potential between the two conductive coatings (electrodes).

The present invention may be further exemplified by reference to FIGS. 9 and 10. FIG. 9 is a top view of an electrochemical reactor of the present invention, and FIG. 10 is a side view of the same reactor. In both FIGS. 9 and 10, the electrochemical reactor comprises a shell 50 in which is placed a circular solid cylindrical electrochemical cell comprising a core 51 comprising a multi-component membrane or a solid electrolyte. The inside surface of the core 51 is coated with an electrically conductive metal or metal oxide which serves as the anode 52. The outer surface of the core is coated with an electrically conductive material 53 which serves as the cathode. Optionally, a wire lead 56 is attached to the inside coating 52, and a second wire lead 57 is attached to the outside coating 53, and the two wire leads are connected to form an external circuit through ammeter 58. A battery may be connected in series with the ammeter. As can be seen from the construction illustrated in FIGS. 9 and 10, the reactor contains an inner open space 54 through the center of the cell and an outer open space 55 between the outer coating 53 or anode of the cell and the shell 50.

The element may, independent of the foregoing, also comprise a catalyst (3). The catalyst may be present as a film over the surface of the element, dispersed or intermingled at the surface of the solid multi-component membrane (e.g., by doping the solid membrane surface), or dispersed or intermingled in a conductive coating. The catalyst, for example, may be a sulfur reducing catalyst on the cathode side of the element or may be a dehydrogenation or oxidative coupling catalyst on the anode side as further discussed below.

The porous substrate (1); conductive coating (2); and/or (3) catalyst may be applied as separate materials or the functions of the porous substrate (1); conductive coating (2); and/or catalyst (3) may be combined in one or two materials.

The electrochemical cell utilized in the processes of the present invention may optionally contain a catalyst adjacent to the element. When the electrochemical cell is used for gas cleanup, for example, the inventors have found that the presence of a catalyst can facilitate reduction of oxides of sulfur and nitrogen and/or facilitate decomposition of carbonyl sulfide at the first conductive surface (i.e., cathode) of the electrochemical cell. When the electrochemical cell is used for converting saturated hydrocarbons to unsaturated hydrocarbons, the presence of a dehydrogenation catalyst adjacent to the second surface of the element can increase the conversion rate and selectivity over that obtained without the dehydrogenation catalyst. When the process is used for making substituted aromatic compounds from aromatic compounds and a second hydrogen-containing compound, the inventors have discovered that the presence of a catalyst, such as a dehydrogenation catalyst or oxidative coupling catalyst, may be used to increase selectivity for the desired substitution of the aromatic compound.

The catalyst may be present in the form of discrete particles or fibers packed adjacent to the surface of the cell membrane.

In one embodiment shown in FIGS. 6 and 7, the electrochemical cell comprises a solid core 33 comprising a solid multi-component membrane having a first surface 32 which is capable of reducing oxygen to oxygen ions. The core 33 has a second surface 34 capable of reacting oxygen ions with an oxygen-consuming gas in a second passageway 36. Adjacent to the second surface 34 is a second passageway 36 containing the catalyst 35.

In practice, processes of the present invention such as the production of unsaturated hydrocarbons or the production of substituted aromatic compounds may be conducted with an apparatus such as illustrated in FIGS. 6 and 7 similarly to the processes using the apparatus of FIGS. 2 and 3. The catalyst 35 can be positioned adjacent to the first surface 32 instead of the second surface 34 by placing the catalyst 35 in a first passageway adjacent to the first surface 32 or by reversing the first surface 32 and second surface 34 such that 32 is the second surface and 34 is the first surface. These last two arrangements may, for example, be used in processes for extraction of oxygen from oxygen-containing gases.

In an embodiment of an electrochemical reactor shown in FIG. 11, the electrochemical cell comprises a solid core 61 comprising a solid multi-component membrane or solid electrolyte coated with a material 62 to form a first electron-conductive surface 63 which is capable of facilitating the reduction of oxygen to oxygen ions. A passageway 71 is adjacent to the first surface 63. First electron-conductive surface 63 comprises the cathode of the cell. The solid core 61 is coated with a material 4 to form a second electron-conductive surface 65 capable of facilitating the reaction of oxygen ions with an oxygen-consuming gas. A catalyst 69 is present in second passageway 70 adjacent to second surface 65. Second electron-conductive surface 65 comprises the anode. The reactor has optional lead wires 66 and 67 which form an external circuit. An ammeter 68 may be included in the external circuit.

The present invention may be further exemplified by reference to FIGS. 12 and 13. In both FIGS. 12 and 13, the reactor comprises a shell 80 in which is placed a circular solid electrochemical cell comprising core 81 comprising a multi-component membrane or solid electrolyte. One surface of the solid core 81 is coated with an electrically conductive metal, metal oxide, or mixture thereof forming the first conductive surface 82. The other surface of the solid core 81 is coated with an electrically conductive material forming the second conductive surface 83. An optional wire lead 87 is attached to the first surface 82, and an optional second wire lead 88 is attached to the second surface 83, and the two wire leads are connected to form an external circuit through optional ammeter 89. A battery may be connected in series with the ammeter. As can be seen from the construction illustrated in FIGS. 12 and 13, the cell contains a first passageway 86 adjacent to the first surface 82. A second passageway 84, which comprises a catalyst 85, is between the second surface 83 and the shell 80.

The particular catalysts which may be utilized with the processes of the present invention are described in detail in the process descriptions which follow.

The preferred embodiments of the electrochemical process follow. (1) Production of Synthesis Gas The electrochemical process for oxidizing a reactant gas to form synthesis gas utilizing the electrochemical reactor of the present invention is conducted at a temperature of from about 1000° C. to about 1400° C. In one embodiment the process is conducted at temperatures within the range of 1000 to 13000° C. The electrolytic cell may be heated to the desired temperature and the temperature may be maintained during the reaction by external heating and/or the exothermicity of the reaction.

The oxygen-containing gas which is passed in contact with the solid membrane on the side facing the first zone can be air, pure oxygen, or any other gas containing at least 1% free oxygen. In another embodiment, oxygen-containing gas contains oxygen in other forms such as $N_2O$, $NO$, $NO_2$, $SO_2$, $SO_3$, steam, $CO_2$, etc. Preferably, the oxygen-containing gas contains at least about 1% free oxygen (i.e., dioxygen), and more preferably the oxygen-containing gas is air.

The feed gases which are treated in accordance with this process for making synthesis gas may comprise light hydrocarbons such as methane, natural gas, ethane, or other light hydrocarbon mixtures. The natural gas can be either wellhead natural gas or processed natural gas. The composition of the processed natural gas varies with the needs of the ultimate user. A typical processed natural gas composition contains about 70% by weight of methane, about 10% by weight of ethane, 10% to 15% of $CO_2$, and the balance is made up of smaller amounts of propane, butane and nitrogen.

The light hydrocarbon gas feed can be mixed with any inert diluent such as nitrogen, helium, neon, argon, krypton, xenon, or any other gas, including steam, which does not interfere with the desired reaction. Nitrogen and steam are diluents of choice.

The synthesis gas produced by this process of the invention at the solid membrane surface facing the second zone is substantially nitrogen-free and comprises a mixture of hydrogen and carbon monoxide, and may contain some acetylene or ethylene or both. The synthesis gas also contains only small amounts of carbon dioxide. The synthesis gas can be converted to liquids using the Fischer-Tropsch process and can be converted to methanol by commercial processes.

(2) Production of Unsaturated Hydrocarbons

The saturated hydrocarbon-containing gases which are treated in accordance with the process of the present invention may comprise any fully or partially saturated hydrocarbon susceptible to dehydrogenation which preferably are stable at operating temperatures in either its saturated or unsaturated form. Examples of saturated hydrocarbons which may be treated in accordance with the present invention include aliphatic hydrocarbons containing from 1 to about 6 carbon atoms, cycloaliphatic hydrocarbons containing 5 or 6 carbon atoms, an aromatic compound having an aliphatic hydrocarbon substituent of 2 to about 6 carbon atoms, a cycloaliphatic hydrocarbon having an aliphatic hydrocarbon substituent of from 2 to about 6 carbon atoms, a saturated or partially saturated heterocyclic compound containing a 5- or 6-membered heterocyclic ring wherein each hetero atom is nitrogen, oxygen or sulfur, a heterocyclic compound containing a 5- or 6-membered unsaturated heterocyclic ring wherein each hetero atom is nitrogen, oxygen or sulfur having an aliphatic hydrocarbon substituent of 2 to about 6 carbon atoms, and mixtures thereof. Preferred saturated hydrocarbons are aliphatic hydrocarbons containing from 2 to about 6 carbon atoms and aromatic compounds having an isolated or fused six membered aromatic ring and at least one aliphatic hydrocarbon substituent having from 2 to about 6 carbon atoms. More preferred saturated hydrocarbons treated in accordance with the process of the present invention are ethane, ethane-containing feed gases, propane, propane-containing feed gases, ethylbenzene, or ethylbenzene-containing feed gases.

The ethane-containing feed gas can be natural gas, a methane pyrolysis exit gas, an oxidative coupling exit gas, or any other gas which contains at least 1% ethane. The natural gas can be either wellhead natural gas or processed natural gas. The Composition of the processed natural gas varies with the needs of the ultimate user. A. typical processed natural gas composition contains about 70% by weight of methane, about 10% by weight of ethane, 10% to 15% of $CO_2$, and the balance is made up of smaller amounts of propane, butane and nitrogen.

In another embodiment of this invention, ethane is mixed with other saturated aliphatic hydrocarbons such as propane, butane, isobutane and/or pentane. The saturated hydrocarbon gas feed can be mixed with any inert diluent such as nitrogen, helium, neon, argon, krypton, xenon, or any other gas, including steam, which does not interfere with the oxidative dehydrogenation of the hydrocarbon. Steam, nitrogen and methane are diluents of choice, and steam and methane are preferred.

This process of the present invention generally is conducted at an elevated temperature of at least about 300° C., and generally at least about 500° C., and the process will generally be conducted at a temperature not greater than about 1100° C. In a preferred embodiment, for example when the saturated hydrocarbon gas is ethane, the reaction is conducted at a temperature of about 600° C. to about 1000° C. and more preferably at a temperature from about 700° C. to about 950° C.

This process of the present invention generally is conducted at a pressure of from about 0.1 to about 100 atmospheres, and more preferably between about 0.5 to about 10 atmospheres. A particularly preferred pressure is 1 atmosphere.

One aspect of the present invention is an electrochemical process for oxidizing methane, natural gas or other light hydrocarbons to unsaturated hydrocarbons conducted utilizing the electrochemical reactor of the present invention at a temperature of about 300° C. up to but not including 1000° C. In one embodiment the process is conducted at temperatures within the range of about 550° C to about 950° C., and more specifically within the range of 750° C. to 950° C. The electrolytic cell may be heated to the desired temperature and the temperature may be maintained during the reaction by external heating and/or utilizing the exothermicity of the reaction.

The feed gases which are treated in accordance with this aspect of the process of the present invention may comprise light hydrocarbons such as methane, natural gas, ethane, or other light hydrocarbon mixtures. A methane-containing feed gas, for example, can be methane or natural gas or any other gas which contains at least 50% methane. The natural gas can be either wellhead natural gas or processed natural gas. The composition of the processed natural gas varies with the needs of the ultimate user. A typical processed natural gas composition contains about 70% by weight of methane, about 10% by weight of ethane, 10% to 15% of $CO_2$, and the balance is made up of smaller amounts of propane, butane and nitrogen.

The light hydrocarbon gas feed can be mixed with any inert diluent such as nitrogen, helium, neon, argon, krypton, xenon, or any other gas, including steam, which does not interfere with the desired reaction. Nitrogen and steam are diluents of choice.

The unsaturated hydrocarbons produced by this aspect of the process of the invention at the solid membrane surface facing the second zone are, for example, ethylene, acetylene, propylene, butylene, isobutylene, and mixtures thereof.

The oxygen-containing gas which is passed in contact with the solid membrane on the side facing the first zone can be air, pure oxygen, or any other gas containing at least 1% free oxygen. In another embodiment, the oxygen-containing gas contains oxygen in other forms such as $N_2O$, $NO$, $NO_2$, $SO_2$, $SO_3$, steam, $CO_2$, etc. Preferably, the oxygen-containing gas contains at least about 1% free oxygen (i.e., dioxygen), and more preferably the oxygen-containing gas is air.

In a preferred embodiment of the process of the present invention, the saturated hydrocarbon-containing gas is passed in contact with the dehydrogenation catalyst adjacent to the second surface of the element (anode), to provide improved unsaturated hydrocarbon yield and selectivity. In one embodiment, the process provides for continuous dehydrogenation of ethane to ethylene or acetylene at high rates of conversion and selectivity, and at low rates of coking. Another preferred process provides for continuous conversion of ethylbenzene to styrene, also at high rates of conversion and selectivity. The process may also be used to generate an electric current, if desired.

The process of the present invention is conducted in a cell which has an element having a first surface capable of reducing oxygen to oxygen ions, a second surface capable of reacting oxygen ions with an oxygen-consuming gas, an electron-conductive path, and an oxygen ion-conductive path. A dehydrogenation catalyst is present in a passageway for the unsaturated hydrocarbon-containing gas adjacent to the second surface.

Turning to FIG. 11, an oxygen-containing gas or gas mixture is passed through passageway 71 and into contact with the first electron-conductive surface 63 (cathode), and a saturated hydrocarbon compound-containing gas is passed through passageway 70 and into contact with the second surface 65 (anode) and dehydrogenation catalyst 69. As the oxygen-containing gas contacts the first surface 63, oxygen is reduced to oxygen ions which are transported through core 61 to the anode side. At the anode (second surface 65), the saturated hydrocarbon contacts the dehydrogenation catalyst to produce hydrogen and the unsaturated hydrocarbon, and the oxygen ions react selectively with hydrogen to produce water, releasing electrons. The electrons may return to the cathode side via the external circuit through lead wires 66 and 67. In this manner, the reactor can generate a current in addition to converting the saturated hydrocarbons to unsaturated hydrocarbons.

This process of the present invention may also be conducted with an electrochemical reactor cell such as illustrated in FIGS. 12 and 13 similarly to the process using the apparatus of FIG. 11.

In another embodiment, the first conductive surface 82 and second conductive surface 83 of FIGS. 12 and 13 are reversed, so that the dehydrogenation catalyst 85 is present in the first passageway 84 adjacent to the first conductive surface 82. In practice, the oxygen-containing gas is passed through the second passageway 86 and a saturated hydrocarbon compound-containing feed gas is passed through the first passageway 84 which has the dehydrogenation catalyst 85. The saturated hydrocarbon-containing compound(s) is/are converted to one or more unsaturated hydrocarbons in the manner described above.

Preferred conductive coatings on the surface of the electrocatalytic reactor cell element are any of a wide variety of conductive materials capable of catalyzing the conversion or dehydrogenation of saturated hydrocarbons to unsaturated hydrocarbons, or capable of promoting the selective oxidation of hydrogen. Examples of metals useful in forming these preferred anode coatings include silver, nickel, gold, bismuth, manganese, vanadium, platinum, palladium, ruthenium, copper, zinc, cobalt, chromium, iron, indium-praseodymium mixtures, or indium-tin mixtures, oxides thereof, and mixtures of said metals and metal oxides. Silver and gold are particularly useful in the present invention.

The preferred electron-conductive materials comprise silver-containing and gold-containing metal compositions. In another preferred embodiment, the second surface is a conductive coating comprising a platinum-containing metal composition.

The process may be conducted in a reactor such as shown in FIGS. 6 and 7, wherein the oxygen ion-conductive path and electron conductive path coexist in the solid core 33. The core 33 has a first surface 32 which is capable of reducing oxygen to oxygen ions. A passageway 31 is adjacent to the first surface 32. The core 33 has a second surface 34 capable of facilitating conversion of oxygen-consuming gases. Adjacent to the second surface 34 and containing the dehydrogenation catalyst 35 is passageway 36.

In practice, the process of the present invention is conducted with an apparatus such as illustrated in FIGS. 6 and 7 similarly to the process using the apparatus of FIGS. 12 and 13.

Dehydrogenation catalysts include those which are useful in promoting oxidative dehydrogenation and thermal (i.e., non-oxidative) dehydrogenation. Oxidative dehydrogenation catalysts facilitate binding hydrogen atoms to an oxidizing agent, such as oxygen, while thermal dehydrogenation catalysts do not require the presence of the oxidizing agent to accomplish dehydrogenation. Preferred oxidative dehydrogenation catalysts are those which promote dehydrogenation of monoolefins, such as molybdates or tungstates of bismuth, cobalt, tin and titanium, tellurium, phosphoric acid deposited on aluminum oxide, phosphates of bismuth, iron, strontium, nickel, chromium and calcium, tungsten, vanadium, indium, bismuth phosphomolybdate and phosphotungstate, mixed oxides of molybdenum and vanadium, mixed oxides of molybdenum, vanadium, and niobium, mixed oxides of antimony and tin, titanium, mixed oxides of tin and arsenic with selenium and tellurium, mixed oxides of iron with aluminum and chromium, mixed oxides of iron and chromium in the presence of potassium carbonate, basic halides of iron, cobalt, magnesium, manganese, gold and platinum, etc.

Specific examples of useful dehydrogenation catalysts are Shell 105 catalyst, which comprises about 90% iron oxide, 4% chromium oxide and 6% potassium carbonate, calcium nickel phosphate catalysts having the composition $Ca_8Ni(PO_4)_6$ mixed with about 2% chromium oxide, and Union Carbide's Ethoxene process catalyst which is a molybdenum, vanadium and niobium based oxide.

Methods for making and using these catalysts are well known in the art. Examples of references describing these catalysts include V. K. Skarchenko, "Oxidative Dehydrogenation of Hydrocarbons," INTERNATIONAL CHEMICAL ENGINEERING, Vol. 9, No. 1, pp. 1–23 (1969); C. N. Satterfield, *Heterogenous Catalysis in Practice*, pp. 199–279 (McGraw-Hill Inc., 1980); U.S. Pat. Nos. 4,315, 864, 4,350,835, 4,410,752, 4,524,236, and 4,524,236; and Thorsteinson et al, "Oxidative Dehydrogenation of Ethane over Catalysts Containing Mixed Oxides of Molybdenum and Vanadium", J. Catalysis 52, pp. 116–132 (1978); which are each incorporated fully herein by reference.

The oxidative dehydrogenation-type catalysts are preferably applied directly to the anode surface of the electrochemical cell element, since oxygen provided on that surface may be used as the oxidizing agent to conduct oxidative dehydrogenation.

In another approach, the oxidative dehydrogenation-type catalyst is. not applied directly to the anode surface of the electrochemical cell element, but is distributed in the second passageway either as a supported or unsupported catalyst, and an oxidizing agent other than oxygen, such as iodine, is introduced into the second passageway with the reactants to provide the conditions necessary for oxidative dehydrogenation.

Preferably, the dehydrogenation catalysts are supported or unsupported catalysts which are useful in promoting thermal dehydrogenation. These catalysts include rhodium, ruthenium, palladium or platinum metal, metal oxides thereof, and mixtures thereof. Amorg these catalysts, platinum is most preferred since in addition to its role as a dehydrogenation catalyst, platinum also acts to minimize the formation of carbonaceous deposits. Reduction in the formation of carbonaceous deposits is presumed to be due to hydrogen chemisorbed onto the platinum which diffuses along the surface of the catalyst, hydrogenating coke precursors on the surface to facilitate desorption from the surface. The inventors, however, do not wish to be bound by this theory, since the particular theory for the advantages with platinum metal is not critical to Practicing the present invention.

Preferably, the catalyst is supported on a support medium. The support medium is any material which does not interfere with the process of the resent invention. Examples of support media include quartz wool, silica, alumina, titania, and zirconia, with quartz wool preferred. Quartz wool may be packed easily reducing the possibility of damage to the cell caused by the force used to pack the cell passageway.

The dehydrogenation reaction which occurs over the catalyst is relatively fast, and contact times of about 0.1 to about 100 seconds are sufficient to produce the desired conversion to unsaturated hydrocarbons. Contact times of about 1 to 20 seconds are generally sufficient and preferred.

In one embodiment of the invention, the conversion of saturated hydrocarbons to unsaturated hydrocarbons is improved by applying an electric potential between the anode and cathode. Generally, a potential of up to about 4 volts can be applied between the electrodes, preferably about 0.1 to about 2 volts. The desired electric potential can be applied by the use of a battery installed in the external circuit formed by 26, 27 and 28 in FIGS. 12 and 13.

In another preferred embodiment, the rate at which the reaction proceeds at the anode can be increased by reducing the distance the oxygen ions must travel between the first and second surfaces. In other words, performance of the cell may be increased by using elements having a thin cross-section relative to the surface area of the element.

(3) Production of Substituted Aromatic Compounds

This process of the present invention is conducted with any electrochemical cell comprising the element and first and second passageways according to the above description of (A). These types of electrochemical cells are also referred to as electrolytic cells, electrogenerative cells or fuel cells. An important feature of the electrochemical cell is that it is capable of transferring oxygen ions from a first surface of an element in contact with an oxygen-containing gas to a second surface of the element which is in contact with an oxygen-consuming gas while transferring electrons from the second surface back to the first surface. These functions can be accomplished by more than one type of electrochemical cell. Preferred embodiments include those which comprise a solid oxygen ion-conductive electrolyte coated on two sides with metal, metal oxide or a mixture thereof (the "external circuit cells") and those which comprise a solid multicomponent membrane having an electron-conductive path "built in" (the "internally short-circuited cells"). These two types of electrochemical cells of this invention are described in detail above.

When the element comprises a conductive coating on a solid electrolyte utilized as a cathode, silver, platinum and mixtures of silver and platinum are preferred as conductive coating metals and metal oxides.

In one embodiment, the anode can also contain, in addition to any of the above-identified conductive metals, an alkali and/or alkaline earth metal or metal oxide such as lithium, sodium, potassium, rubidium, cesium, beryllium, magnesium, calcium, strontium, barium and the corresponding oxides. The combination of lithium and magnesium is particularly useful. The amount of alkali and/or alkaline earth metal included in the coating (anode) may be varied over a wide range such as from about 1% to about 50% by weight and preferably between about 5% to about 20% by weight. Specific examples of such mixed anodes include Cu/Li/Mg, Ag/Li/Mg, Ag/Sm/Li/Mg, and Ag/Bi/Li/Mg.

The alkali and/or alkaline earth metal or metal oxides may be included in the conductive material either before or after the conductive material is deposited on the surface of the solid electrolyte. It is also possible to dope, coat, or otherwise treat the anode with additional materials to influence its stability, structure and/or reactivity for surface interactions with saturated hydrocarbons.

Specific examples of conductive coatings useful in the invention, and a method of preparing such coatings are as follows:

Ag: A tube is coated with silver ink (Engelhard A 3148).

Ag/Li/Mg: A tube is coated sequentially with silver ink (A3148), and then with a slurry of magnesium oxide (MgO) and lithium carbonate [$Li_2CO_3$] (14.6% w lithium) in water.

Pt: A tube is coated with platinum ink from Engelhard (#6926).

Pt/Bi: A platinum anode prepared as above is coated with a slurry of bismuth oxide [$Bi_2O_3$] in water.

In one embodiment, electron-conductive materials comprise silver-containing metal compositions. In one preferred embodiment, the material comprises silver-containing metal compositions which also contain bismuth and optionally, an alkali and/or alkaline earth metal or metal oxide. In another preferred embodiment, the second surface is a conductive coating comprising a platinum-containing metal composition.

In one embodiment of the invention, the conversion of the aromatic compound to an aromatic compound substituted with a second compound in the mixture is improved by applying an electric potential between the anode and cathode. Generally, a potential of up to about 4 volts can be applied between the electrodes. The desired electric potential can be applied by the use of a battery installed in the external circuit formed by 66, 67, and 68 in FIG. 11.

However, the inventors have also found that a high rate of conversion can also be achieved by selecting a solid electrolyte with a small thickness (i.e., a small volume per unit area) between the first surface and the second surface, relative to the exposed surface area of the electrolyte, which reduces the distance the average oxygen ion must travel through the electrolyte per unit area. This conversion rate enhancing effect does not require attaching an external direct current power source, making this a preferred approach for increasing the conversion rate economically.

The electrochemical cell utilized in the process of the present invention may optionally contain a catalyst in the second passageway. The inventors have found that the presence of a catalyst in the second passageway can facilitate obtaining a desired product selectivity and conversion rates for the present invention process. The catalyst may be present as a thin film over the second surface of the element of electrochemical cell or may be present in the form of discrete particles or fibers packed in the second passageway of the same. The catalyst may be used in combination with either external circuit cells or internally short-circuited cells.

This continuous process is practiced in a manner similar to the process for producing unsaturated hydrocarbons described above, except that a mixture of a hydrogen-containing compound and a second hydrogen-containing compound are substituted for the saturated hydrocarbon compound and the catalyst may be an oxidative coupling catalyst as well as a dehydrogenation catalyst as further explained below.

In a preferred embodiment of the present invention, the catalyst in the second passageway is a dehydrogenation catalyst or oxidative coupling catalyst and the oxygen-consuming gas mixture preferably comprises a saturated hydrocarbon. The inventors have found that selectivity for substitution of the aromatic compound with the saturated hydrocarbon is generally increased in the presence of such a catalyst.

The presence of a dehydrogenation or oxidative coupling catalyst in the second passageway can also be used to enhance selectivity for aromatic compounds substituted with an unsaturated hydrocarbon, even when the reaction mixture contains only saturated hydrocarbons as the second hydrogen-containing compound. The process of converting a mixture of benzene and ethane can, for example, be made more selective for producing styrene, as opposed to producing ethylbenzene or biphenyl, by the presence of a dehydrogenation or oxidative coupling catalyst.

Dehydrogenation catalysts include those which are useful in the above-described process for production of unsaturated hydrocarbon compounds.

Some dehydrogenation catalysts are preferred when used in the presence of halogen- or sulfur-containing additives in the reaction zone, which decompose under reaction conditions to form halogens or sulfur dioxide. Examples of such catalysts are those comprising oxides of iron, cobalt, nickel, manganese, vanadium, molybdenum, bismuth, tin, cadmium and copper, magnesium phosphate, etc., including mixtures thereof. Halogen-containing additive systems are described, for example, in U.S. Pat. Nos. 3,207,807, 3,207,808, 3,207,809, 3,207,810, 3,207,811, 3,210,436 and 3,211,800; British Patent No. 988,619; French Patent No. 1,397,284; Neth. Application No. 6,500,024; and Belgian Patent No. 658,368 and sulfur-containing additive systems are described in Belgian Patent No. 617,892; British Patent Nos. 998,784 and 984,901; and French Patent No. 1,407,830, each of which is fully incorporated herein by reference.

Oxidative coupling catalysts which may be used in the present invention include those which are used for oxidative coupling between hydrocarbons in the reaction mixture. Oxidative coupling catalysts useful for coupling of methane to form ethane and ethylene may be used in order to use methane as the second hydrogen-containing compound of the oxygen-consuming gas, and oxidative coupling catalysts may be used to facilitate the reaction between the hydrogen-containing aromatic compound and a second hydrogen-containing compound. Examples of oxidative coupling catalysts include oxides of lead, bismuth, tin, antimony, tellurium, cadmium, gallium, germanium, indium, zinc, calcium, and rare earth metals such as samarium, holmium, gadolinium, erbium, thulium, ytterbium, yttrium, lanthanum, neodymium, europium, dysprosium, lutetium, praseodymium, and terbium. A variety of doped magnesium oxides are also useful as oxidative coupling catalysts. Alkali metal-doped magnesium oxides, such as sodium-, potassium- or cesium-doped magnesium oxides are effective oxidative coupling catalysts.

Preferably, these catalysts are supported catalysts. The support material is any material which does not interfere with the process of the present invention. Examples of support materials include quartz wool, silica, alumina, titania, and zirconia, with quartz wool preferred. Quartz wool may be packed easily, reducing the possibility of damage to the cell caused by the force used to pack the passageway of the cell.

The process of the present invention is generally conducted at a temperature of at least about 300° C., and preferably at a temperature of at least about 500° C. The temperature is preferably no greater than about 1100° C., and more preferably no greater than about 950° C. The temperature for a particular electrochemical cell/feed gas composition system can easily be optimized by one of ordinary skill in the art by checking conversion rates at different temperatures for the optimum conversion rate temperature. The upper limit to operating temperature is generally just below the temperature at which a substantial amount of the desired products or reactants decompose into undesired fragments or byproducts.

The oxygen-containing gas which is passed in contact with the first surface or cathode can be air, pure oxygen, or any other gas containing at least 1% oxygen. In another embodiment, the oxygen-containing gas does not contain dioxygen, but rather contains oxygen in other forms such as $N_2O$, $CO_2$, $SO_2$, $NO_2$, NO, etc. Preferably, the oxidizing gas is a dioxygen-containing gas such as air.

The hydrogen-containing aromatic compounds may be any aromatic ring-containing compound which has hydrogen as a substituent, including substituted or unsubstituted mono- or polycyclic aromatic compounds. The aromatic ring or rings may contain one or more hetero atoms or hetero atom-containing groups as substituents or as ring members, so long as the aromatic compound retains a predominantly aromatic hydrocarbon character. Typical hetero atoms include nitrogen, oxygen and sulfur.

The hydrogen-containing aromatic compounds are generally selected from among those which are gaseous and reasonably stable (i.e., resistant to decomposition) at the operating temperature of the electrochemical cell. Examples of such aromatic compounds include thiophene, thiazole, pyrazole, benzene, toluene, ethylbenzene, xylene, phenol, benzyl alcohol, benzaldehyde, acetophenone, pyridine, benzoic acid, phenylbenzene, indene, indole, benzothiophene, benzothiazole, naphthalene, quinoline, cinnoline, anthracene, anthraquinone, phenanthrene, pyrene, carbazole, etc. Among these, monocyclic aromatic compounds having a 6-membered aromatic ring are preferred, and benzene is most preferred for its stability at operating temperature and for economic reasons.

The second hydrogen-containing compound may be selected from a wide range of compounds containing hydrogen which are capable of oxidative coupling with the aromatic compound introduced to the second passageway of the electrochemical cell. These compounds include saturated or unsaturated, substituted or unsubstituted hydrocarbonaceous compounds, such as substituted or unsubstituted, saturated or unsaturated aliphatic hydrocarbons, and hydrogen-containing inorganic compounds, such as methane, substituted methane, hydrogen cyanide, ammonia, hydrogen halides, such as hydrogen chloride and hydrogen iodide, etc., or mixtures thereof. Substituted methane includes halogen-substituted methane, methanol, methylamine, methyl cyanate, methyl isocyanate, etc. One of ordinary skill can easily identify additional hydrogen-containing compounds suitable as substituents for aromatic compounds in accordance with the spirit and scope of the present invention.

The substituents derived from the second hydrogen-containing compound are simply the second compound less at least one hydrogen atom. From the above examples, hydrocarbyl, cyano, amino, halo, etc., can be mentioned as examples of substituents on the substituted aromatic compound produced by the process of this invention.

When more than one hydrogen atom is removed from the site where the second compound is coupled to the aromatic compound, further possibilities exist, such as unsaturation of the second compound, so that if the second compound is a hydrocarbon, it may form a double bond, for example, where none previously existed. This occurs when, for example, the mixture entering the second passageway of the electrochemical cell is benzene and ethane. Not only car ethylbenzene be produced, but also styrene (i.e., vinyl benzene). Styrene is well known as a starting material for commercial production of polystyrene and many copolymers having styrene as one of its monomer units.

Preferred second hydrogen-containing compounds are substituted or unsubstituted methane and substituted or unsubstituted, branched or straight chain, saturated or unsaturated aliphatic hydrocarbons, particularly those having from 2 to about 5 carbon atoms, such as methane, methyl methacrylate, ethane, ethylene, propane, propylene, butane, butylene, pentane, 2-methyl butane, etc. Particularly preferred among these aliphatic hydrocarbons are those having from 2 to 4 carbon atoms, such as ethane, ethylene, propane, propylene, butane, isobutane, 1-butene, 1,4-butadiene, etc., since they are relatively stable and can be dehydrogenated somewhat more easily than many other hydrocarbons.

The process of the present invention generally is conducted at a pressure of from about 0.1 to about 100 atmospheres, more preferably between about 0.5 to about 10 atmospheres, and even more preferably about 1.0 atmosphere.

The flow rate of the reaction mixture through the cell may be varied as desired so long as there is sufficient contact by the reaction mixture with the anode to produce the desired substituted aromatic compound. Contact times of from 0.1 to about 100 seconds may be used, and contact times of from 1 to 20 seconds are generally sufficient.

(4) Extraction of Oxygen from Oxygen-Containing Gas

The electrochemical process for extracting oxygen from an oxygen-containing gas in accordance with the present invention is conducted utilizing the electrochemical cell of the present invention. The process is generally conducted at a temperature within the range of about 300° C. to about 1400° C. In one embodiment, the process may be conducted in the range from about 500° C. to about 1400° C. In another embodiment the process is conducted within the range of about 700° C. about 1100° C. In a preferred embodiment, the process is conducted at a temperature of at least about 400° C. and is preferably no greater than about 1000° C., and even more preferably no greater than about 900° C. The electrochemical cell may be heated to the desired temperature and the temperature may be maintained during the reaction by utilizing a hot flue gas, external heating, and/or utilizing the exothermicity of the reaction.

The oxygen-containing gas which is treated in accordance with the process of the present invention may be any gas which contains free oxygen and/or contains oxygen in other forms such as $N_2O$, $NO$, $NO_2$, $SO_2$, $SO_3$, $H_2O$ (g) (i.e., steam), $CO_2$, or a mixture of oxygen-containing gases, such as a flue gas, etc.

The reactant gas comprises any gas which is capable of reacting with oxygen or oxygen ions, including one or more hydrocarbons which are in the gas phase and capable of reacting with oxygen or oxygen ions under process conditions such as saturated and unsaturated lower aliphatic hydrocarbons such as methane, natural gas, ethane, ethene, acetylene, propane, propene, propyne, butane, butene, butyne, isobutane, isobutene, etc., saturated and unsaturated lower cyclic hydrocarbons such as cyclopropane, cyclobutane, cyclobutene, etc., aromatic hydrocarbons such as benzene, naphthalene, etc., and mixtures thereof; natural gas; hydrogen; carbon monoxide; hydrogen sulfide; methanol; ammonia; etc.; and mixtures thereof. Selecting one or more gases which are capable of reacting with oxygen or oxygen ions under the reaction conditions of the present invention is within the purview of those skilled in the art.

Preferred reactant gases or gas mixtures for use in this process are those that are inexpensive per unit of volume, are a by-product of an industrial process, and/or form useful products when they react with oxygen or oxygen ions. A particularly preferred gas for use as a reactant gas is natural gas.

In one embodiment of this process of the present invention, at least one electrochemical cell is provided in the path of flue or exhaust gases for cleaning, purifying or recycling flue or exhaust gas emissions. The electrochemical cell in this process separates a fuel gas zone from a zone containing flue or exhaust gas.

The gas containing oxides of sulfur and/or nitrogen which is passed in contact with the first surface or cathode can contain $SO_2$, $SO_3$, $NO_2$, $NO$, $N_2O$, etc., in amounts as low as about 0.001 mol % up to 100 mol %. Preferably, the amount of sulfur and/or nitrogen in the gas stream to be treated is in the range from about 0.005 to about 5 mol %, and more preferably in the range from about 0.1 to about 1 mol %, since typical flue and exhaust streams contain oxides of sulfur and/or nitrogen in this more preferred range of operation.

In practice, a gas mixture containing one or more oxides of sulfur and/or nitrogen is passed in contact with the first surface of the element (the cathode), and the reducing gas is passed in contact with the second surface of the element (anode). As the pollutant-containing gas contacts the first surface, oxygen is reduced to oxygen ions which are transported through the element to the anode side. At the anode side (second surface), the oxygen ions react with the reducing gas and electrons are released. The electrons return to the cathode side.

In one embodiment, the process of the present invention is conducted with an apparatus such as illustrated in FIGS.

9 and by passing a reducing gas through the inner open space 54 and a gas stream containing oxides of sulfur and/or nitrogen through the outer open space 55. The oxides of sulfur and nitrogen which contact the outside conductive coating 53 are reduced, releasing oxygen ions which migrate through the core 51 to the inside conductive coating 52. At the surface of the inside coating 52, the oxygen ions react with the reducing gas contacting the inside conductive coating 52. During this reaction, the oxygen ion loses two electrons which travel from the inner conductive coating 52 to the outer surface coating 53 through the core 51 and, optionally, through the circuit formed by leads 56 and 57 and the ammeter/battery 58.

In yet another embodiment, the anode and cathode are reversed. That is, inside conductive coating 52 is the cathode and the outer conductive coating 53 is the anode. In this embodiment, the fuel gas is passed through the outer open space 55, and the gas stream containing oxides of sulfur and/or nitrogen is passed through the inner or central open space 54. Otherwise, the process in this embodiment is the same as the embodiment discussed above.

In the last two embodiments of the invention, the rate of gas cleanup is improved by applying an electric potential between the anode and cathode. Generally, a potential of up to about 4 volts can be applied between the electrodes. The desired electric potential can be applied by the use of a battery installed in the external circuit formed by 56, 57 and 58 in FIG. 10.

However, the inventors have also found that a high rate of gas cleanup can also be achieved by selecting a solid membrane or electrolyte with a small thickness between the first surface and the second surface, relative to the exposed surface area of the electrolyte (i.e., a small electrolyte volume per unit area), which reduces the distance the average oxygen ion must travel through the electrolyte per unit. area. Thin-walled high density yttria-stabilized zirconia tubes having such an increased efficiency effect due to a wall thickness of 1 millimeter, for example, may be obtained from Zircoa Products, Solon, Ohio. This efficiency enhancing effect does not require attaching an external direct current power source, making this a preferred approach for conducting the process economically.

One method for fabricating thin gas-tight refractory oxide layers for use in the electrocatalytic cell solid electrolyte of the present invention is a "vapor deposition" process, such as the electrochemical vapor deposition process disclosed by Westinghouse Electric Corporation in A. O. Isenberg, PROCEEDINGS OF THE ELECTROCHEMICAL SOCIETY, Vol. 77, No. 6, pp. 572–583 (1977), which is hereby incorporated herein by reference.

Among the metals and metal oxides that may be present as the conductive metal, metal oxide or mixture thereof on the cathode, silver, platinum and gold are generally preferred.

In addition to sulfur and/or nitrogen oxides, the gas stream to be purified may also contain other components, such as nitrogen gas, oxygen gas, argon, helium, carbon dioxide, steam, carbon monoxide, unburned fuel, etc. The presence of oxygen-containing gases such as oxygen gas and carbon dioxide, for example, may waste some of the fuel gas used to convert oxides of sulfur and/or nitrogen. The inventors have found, however, that the present invention is particularly economical when used with such gas streams, since the additional fuel gas utilized is far less expensive than electricity used in electrolytic processes such as that disclosed in U.S. Pat. No. 4,659,448 under the prevailing cost of fuel gas versus kilowatt hours of electricity in most areas.

The electrochemical cell utilized in the process of the present invention may optionally contain a catalyst adjacent to or coated on the first conductive surface. The inventors have found that the presence of a catalyst can facilitate reduction of oxides of sulfur and nitrogen and/or facilitate decomposition or carbonyl sulfide at the first conductive surface (i.e., cathode) of the electrochemical cell. The catalyst may be present as a film over the first conductive surface of the solid electrolyte of the electrochemical cell, dispersed or intermingled in the first conductive coating (e.g., by doping the electron-conductive coating), or present in the form of discrete particles or fibers packed adjacent to the first conductive surface of the cell (cathode).

In practice, the process of the present invention is conducted with an electrochemical cell such as illustrated in FIGS. 12 and 13 similarly to the process using the electrochemical cell of FIGS. 9 and 10.

Preferred catalysts for the first passageway include oxides of lanthanum, oxides of lanthanum doped with europium (Eu), oxides of a mixture of lanthanum, strontium and cobalt, oxides of a mixture of zinc and iron, oxides of molybdenum and oxides of tungsten. Specific examples of catalysts for reducing oxides of sulfur include $La_2O_3$, $La_{0.6}Sr_{0.4}CoO_3$ (a perovskite), $ZnFe_2O_4$, $ZnMoO_4$, $FeWO_4$, etc. These catalyst materials may, or may not, retain the molecular formula and/or structure set forth here during the process of the present invention, since the sulfur atom can be highly reactive towards, and combine with, certain elements in the catalyst examples. Lanthanum oxides, for example, tend to form lanthanum oxysulfides, and perovskites, such as the aforementioned lanthanum-strontium-cobalt perovskite, often lose their perovskite structure when in contact with oxides of sulfur, for example.

Methods for making and using these catalysts are well known in the art. Examples of references describing these catalysts include Baglio, "Lanthanum Oxysulfide as a Catalyst for the Oxidation of CO and COS by $SO_2$," Ind. Eng. Chem. Prod. Res. Dez. (1982) vol. 21, pp. 38–41 and Hibbert et al, "Flue Gas Desulfurization: Catalytic Removal of Sulfur Dioxide by Carbon Monoxide on Sulphided $La_{1-x}Sr_xCoO_3$," Part II, Applied Catalysis (1988) vol. 41, pp. 289–299, which are each incorporated fully herein by reference for the relevent portions of their disclosure.

This process of the present invention is generally conducted at a temperature of at least about 300° C., and preferably at a temperature of at least about 400° C. The process temperature is preferably no greater than about 1000° C., and more preferably no greater than about 900° C. The temperature for a particular electrochemical cell/feed gas composition system can easily be optimized by one of ordinary skill in the art by checking conversion rates at different temperatures for the optimum conversion rate temperature. The upper limit to operating temperature is generally just below the temperature at which the electrochemical cell components decompose into undesired materials.

The step of heating the electrochemical cell may be partially or completely provided by the heat normally present in the flue or exhaust gas, such as that generated by combustion of hydrocarbons or may be heated by an external source. Methods of temperature control, including cooling by injection of a lower temperature gas or mixture of gases into the reactant gas zone and/or the zone containing the flue or exhaust gas, convective cooling, liquid cooling, etc., may be used if necessary to prevent overheating during the electrochemical process, and can be accomplished by various means which are known in the art. Such means are contemplated as being within the scope of this invention.

Generally, this process of the present invention is conducted at a pressure of from about 0.1 to about 100 atmospheres, more preferably between about 0.5 to about 10 atmospheres, and even more preferably about 1.0 atmosphere.

The flow rate of the sulfur and/or nitrogen oxide-containing gas stream through the cell may be varied as desired so long as there is sufficient contact by the gas stream with the cathode to obtain the desired reduction in sulfur and nitrogen oxide emissions. Contact times of from 0.1 to about 100 seconds may be used, although contact times of from 1 to 20 seconds are generally sufficient.

The flow rate of the reducing gas may also be varied as desired so long as there is sufficient contact by the reducing gas with the anode to obtain the desired reduction of sulfur and nitrogen oxide emissions.

In the following Examples, oxygen-consuming gases are treated in a laboratory reactor similar to the reactor illustrated in FIG. 1.

Multi-Component Membrane Preparation Examples

The multi-component membranes used in Examples A-1 to A-14 were prepared as follows.

EXAMPLE A

The dual conductor membrane used in Examples A-1 and A-2 below is fabricated by making a disk which contains palladium metal as the electronically-conductive phase and yttria-stabilized zirconia (hereinafter "YSZ") as the ionically-conductive phase. A powder mixture of 50% each of palladium oxide and yttria (8 mol. %)-stabilized zirconia is first made. The powder is then heated in a mixture of hydrogen and nitrogen atmospheres at 400° C. for 15 minutes to reduce the palladium oxide to palladium metal. To 4.0 grams of the mixture are added 0.4 grams Carbowax 20M™ (obtained from Supelco) dissolved in chloroform, and the resulting mixture is dried at 85° C. The resulting Pd/yttria-stabilized zirconia/Carbowax 20M™ powder is pressed into a disk using 6,000 psi applied pressure. The disk is then sintered in air at 1500° C. for 30 minutes. The resultant disk is dense and gas tight. The disk is one inch in diameter and 0.03 inch (0.76 mm) thick.

EXAMPLE B

The dual-conductor membrane used in Example A-3 below is fabricated by making a disk which contains platinum metal as the electronically-conductive phase and YSZ as the ionically-conductive phase. 9.52 grams of Engelhard Platinum Ink (a product of Engelhard Corporation: Cat. no. 6926) is diluted with 3 cc of alpha-terpineol and then 2.00 grams of yttria (8 mol. %)-stabilized zirconia is admixed in the diluted ink. The mixture is evaporated to dryness and the terpineol burned off in an oven at 100° C. The dried mass is then pulverized and 8.49 grams of the dried, pulverized powder is added to 0.94 grams of Carbowax 20M™ dissolved in 20 cc of chloroform. The chloroform is evaporated off and the remaining powder is dried in an oven at 85° C. for about 30 minutes and the powder is lightly reground and seived through a 120 mesh seive. Then 5.00 grams of the seived Pt/yttria-stabilized zirconia/Carbowax 20M™ powder is pressed into a disk having a diameter of 1⅜ inch (3.50 cm) using 60,000 psi applied pressure. The disk is then heated at a rate of 1½° C./minute to 1650° C., sintered in air at 1650° C. for two hours, and cooled at a rate of 4° C./minute. The resultant disk is dense and gas-tight.

EXAMPLE C

The dual-conductor membrane used in Example A-4 below is fabricated by making a disk which contains a combination of lanthanum, chromium and magnesium oxides as the electronically-conductive phase and YSZ as the ionically-conductive phase. A powder mixture of 0.25 grams MgO, 5.52 grams $CrO_3$ and 10.00 grams $La_2O_3$ is first made. The powder is then dried at 100° C. and recrushed. Then 5.0 grams of the resulting $La(Cr_9Mg)$ powder is added to a hot aqueous solution containing 0.5 grams of $B_2O_3$ and the resulting solution is then dried and crushed to a very fine powder. Then 4.5 cc of the B-MgLaCr powder is admixed with 4.5 cc of yttria (8 mol. %)-stabilized zirconia followed by 10 weight percent Carbowax 20M™ dissolved in chloroform. The resulting mixture is then dried and recrushed into a powder mixture. 4.0 grams of the powder mixture is pressed into a disk using 60,000 psi applied pressure. The disk is heated at a rate of from 1° C. to 2° C./min. to 1400° C., sintered in air at 1400° C. for a total of 45 minutes, and cooled at a rate of 3.9° C./min. The resultant disk is dense and gas tight.

EXAMPLE D

The dual conductor membrane used in Example A-5 below is fabricated by making a disk which contains $BMgLaCrO_x$ as the electronically-conductive phase and YSZ as the ionically-conductive phase in accordance with Example C above which after sintering is impregnated on one side (the anode side) with praseodymium, yttrium, and zirconium. The $BMgLaCrO_x$/YSZ disk is impregnated by applying 0.1 cc of an aqueous solution containing 0.218 grams $Pr(NO_3)_3.5H_2O$, 0.212 grams $Zr(NO_3)_4.6H_2O$, and 0.0115 grams $Y(NO_3)_3.6H_2O$ per cc of water to one surface of the disk. The disk is then dried and heated to 1100° C. under air.

EXAMPLE E

The dual conductor membrane used in Examples A-6 and B-3 below is fabricated by making a disk which contains praseodymium-doped indiun oxide as the electronically-conductive phase and YSZ as the ionically-conductive phase. A powder mixture of 31.22 grams of $In_2O_3$ powder, 4.26 grams of $Pr_6O_{11}$ powder, 29.70 grams of yttria (8 mol. %)-stabilized zirconia powder, 100 cc of distilled $H_2O$, hour drops of Darvan C (a dispersing agent commercially available from R. T. Vanderbilt and Company, Inc., of Norwalk, Conn.) and zirconia grinding media is milled in a ball mill for 17 hours. The mixture is then dried at 200° C., 10 weight percent Carbowax 20M in chloroform is admixed, and the total mixture is again dried at 100° C. to remove the chloroform. The powder mixture is then recrushed and 4.0 grams of the mixture is pressed into a disk using 60,000 psi applied pressure. The disk is then heated at a rate of from 0.5° C. to 1° C./min. to 1550° C., sintered in air at 1550° C. for 3 hours, and cooled at a rate of 1° C./min. The resultant disk is dense and gas tight and has a final diameter of 3.12 cm.

Figure 4:
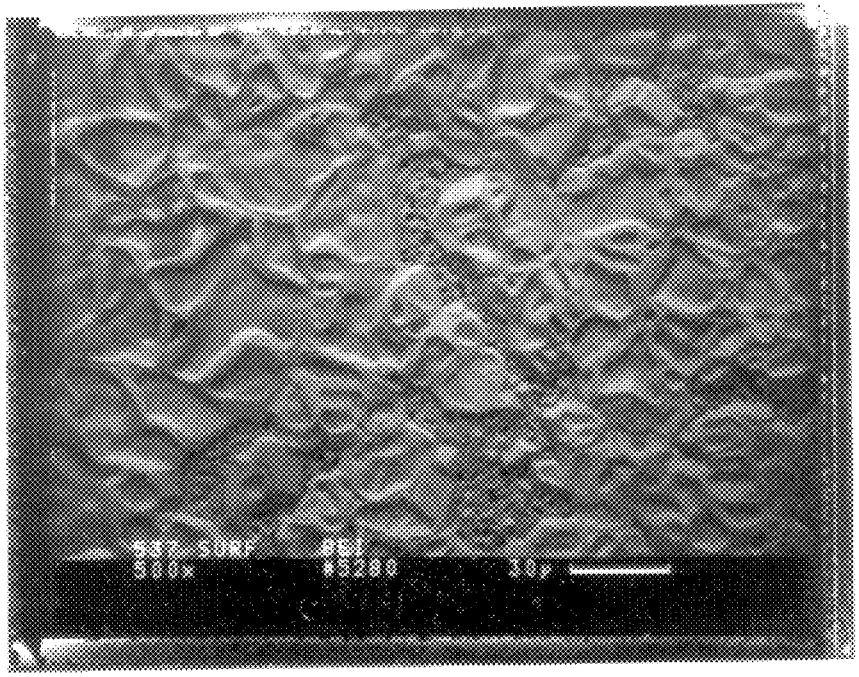
FIG. 4 is an electron photomicrograph back scattered image of the surface of one embodiment of the solid multi-component membrane of the present invention at 500 times magnification.

An electron photomicrograph back-scattered image of the surface of the dual conductor membrane prepared according to Example E above at 500 times magnification is shown in FIG. 4. Two regions that correspond to the two phases of the membrane are clearly evident in the image. The flatter, smoother regions comprise the oxide ion conductive phase, primarily yttria-stabilized zirconia, as confirmed by X-ray adsorption mapping. The thin, small-grained ribbon extending from nearly the top to the bottom in the center of the micrograph is the electronically conductive phase comprised primarily of indium oxide.

Figure 5:
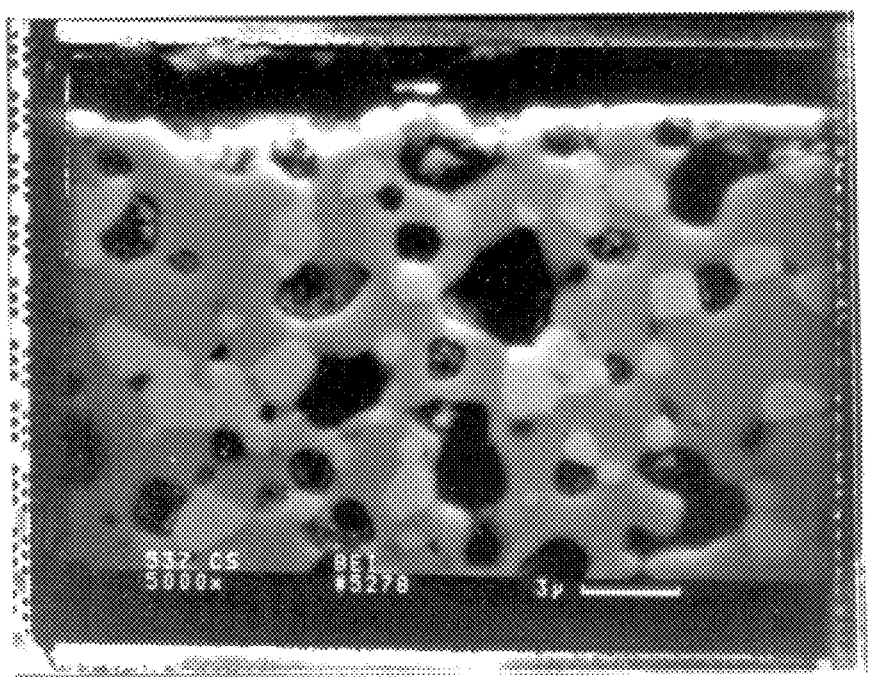
FIG. 5 is an electron photomicrograph of a cross-section of the same solid multi-component membrane shown in FIG. 4 at 5,000 times magnification.

A second electron photomicrograph of the same membrane of Example E in cross section magnified 5,000 times is shown in FIG. 5. The small, white particles are the electronically conducting indium-containing phase and the gray region is the ionically conducting phase, primarily yttria-stabilized zirconia. The extremely dark regions are due to small voids created in the cross-section surface during sample preparation.

The following Examples illustrate how to make membranes comprising a mixed metal oxide of a perovskite structure. Examples F and G illustrate the above-described preparation from the oxides.

EXAMPLE F

A solid membrane is fabricated based upon an $ABO_3$-type material of the formula $La_{0.2}Sr_{.8}CoO_x$. A powder mixture of 7.50 grams $La_{0.2}O_3$, 18.47 grams $Co_3O_4$, and 19.08 grams SrO are ball-milled in ethyl alcohol using zirconia grinding media for about 24 hours. The resulting slurry is evaporated to dryness at 90° C. and crushed into a dry powder. This powder is admixed with 10 weight-percent Carbowax 20M™ dissolved in chloroform. The resulting mixture is dried at room temperature and recrushed into a powder mixture and sieved through an 80 mesh screen. Four grams of a powder is pressed into a desired shape using 60,000 psi applied pressure. The shaped mixture is then slowly heated to about 600° C. to burn out the Carbowax™ binder, heated at a rate of about 0.6° C./min to 1200° C., maintained at 1200° C. for about 5 hours and cooled to about 105° C. at a rate of about 0.9° C./min. The resultant membrane is dense and gas-tight.

EXAMPLE G

A membrane is prepared according to the method of Example F, except an equivalent molar amount of CaO is substituted for SrO, to make a composition having the formula $La_{0.2}Ca_{0.8}CoO_x$.

The following Examples H-L illustrate preparation of solid membranes according to the above-described thermal decomposition of nitrate and/or acetate salt method.

EXAMPLE H

About 20.0 grams of lanthanum acetate, about 49.35 grams of strontium nitrate and about 72.61 grams of cobalt acetate are dissolved in water. The solution is evaporated to near dryness on a hot plate while stirring. The concentrated mixture is then heated at 450° C. for one hour in air. The resulting powder is ground in acetone and then calcined at 1150° C. in air for 5 hours. The resulting powder is ball milled in acetone containing 3 drops Darvan C™ dispersing agent using zirconia grinding media for 20 hours. The powder suspension is dried at 200° C., 10 weight percent Carbowax 20M™ in chloroform is admixed, and the total mixture is then slowly dried on a hot plate while stirring, followed by further drying at 90° C. in an oven. The resulting powder is crushed with a mortar and pestle and sieved through an 80 mesh screen. Four grams of the resulting powder is pressed into a desired shape using 60,000 psi applied pressure. The shaped mixture is then slowly heated to 600° C. to burn out the Carbowax™ binder, and is then heated to 1200° C. at a rate of about 0.6° C./min and maintained at 1200° C. for about 5 hours and permitted to cool. The resultant $La_{0.2}Sr_{0.8}CoO_x$ $ABO_3$-type multi-component membrane is dense and gas-tight.

EXAMPLE J

A solid membrane is prepared according to the method of Example H, except iron acetate is substituted for cobalt acetate at an equivalent molar amount of metal ion. The formula representing the product may be expressed as $La_{0.2}Sr_{0.8}FeO_x$.

EXAMPLE K

A solid membrane is produced according to the method in Example H, except that iron acetate and chromium acetate are substituted for cobalt acetate in amounts such that the molar ratio of iron to chromium is 4:1 and the total molar content of iron and chromium is equivalent to the number of moles of cobalt. The products produced may be represented by the formula $La_{0.2}Sr_{0.8}Fe_{0.8}Cr_{0.2}O_x$.

EXAMPLE L

A solid membrane is produced according to the method of Example H, except that gadolinium acetate is substituted for lanthanum acetate at equivalent molar amounts of metal ions. The products produced may be represented by the formula $Gd_{0.2}Sr_{0.8}CoO_x$.

Preparation of solid membranes by the above-described citric acid preparation method is illustrated by Example M below.

EXAMPLE M

A $La_{0.2}Sr_{0.8}Fe_{x.8}Cr_{0.1}Co_{0.1}O_x$ $ABO_3$-type multicomponent membrane is fabricated from the nitrates or acetates by mixing them in a citric acid solution. About 30.0 grams of lanthanum nitrate, 60.96 grams of strontium nitrate, 117.85 grams of iron nitrate, 14.59 grams of chromium nitrate, 10.61 grams of cobalt nitrate and 138.71 grams of citric acid are dissolved in water. The solution is placed in a round glass flask and mixed on a rotating evaporator under vacuum, at 80° C. until the mixture thickens. The liquid is poured into an evaporating dish and dried in a vacuum oven, at 110° C., under a partial vacuum for 20 hours. The powder is crushed and then calcined in air at 200° C. for 1 hour and then at 900° C. for 24 hours. The powder is placed in a plastic jar and ball-milled in acetone containing 3 drops of Darvan C™°dispersing agent with zirconia grinding media for 24 hours. The powder suspension is dried at 90° C., 5 weight percent Carbowax 20M™ in chloroform is admixed, and the total mixture is then slowly dried on a hot plate while stirring, followed by further drying at 90° C. in an oven. The resulting powder is crushed with a mortar and pestle and sieved through a 60 mesh screen. Four grams of the resulting powder is pressed into a desired shape using 37,500 psi applied pressure. The shaped mixture is slowly heated to 600° C. to burn out the Carbowax™ binder, and is then heated to 1200° C. at a rate of about 0.6° C./min and maintained at 1200° C. for about 5 hours and then permitted to cool. The resultant membrane is dense and gas-tight.

EXAMPLE N

Following the method of Example M, a $La_{0.2}Sr_{0.8}Fe_{0.8}Mn_{0.2}O_x$ $ABO_3$-type multi-component membrane is fabricated by substituting the nitrates (or respective acetates) of the metals of this membrane in the quantities required to achieve the relative molar amounts in the above $ABO_3$-type formula.

Oxygen Flux Results

Each dual-conductor disk of Examples A–N above is bonded between two one-inch diameter YSZ or mullite tubes. One end of this assembly is fitted with a quartz-lined stainless steel or mullite feed tube for introducing the oxygen-consuming gas and the other end of this assembly is fitted with a stainless steel, mullite, or silicon carbide feed tube for introducing the oxygen-containing gas. In each of the following Examples, the assembly is placed in a split furnace which can be heated to 1100° C. The rate of oxygen flux through the disks comprising mixed metal oxides tested in Examples A-7 to A-14 is determined by feeding 60 cc/min of a standard fuel mix to the fuel side of the disk, feeding 200 cc/min of air to the opposite side of the disk, analyzing the gas composition exiting the fuel side of the disk for volume percent $CO_2$, CO and $N_2$ with a gas chromatograph, and measuring the volume percent of water in the effluent by collecting for water with a dry ice/acetone trap from the gas exiting the fuel side of the disk. The following formulae summarize how total oxygen flux and oxygen flux per unit surface area are calculated:

| | |
|---|---|
| Total $O_2$ flux = | ($O_2$ in effluent) + ($O_2$ in effluent as $H_2O$) – ($O_2$ in feed) – ($O_2$ leakage) |
| $O_2$ in effluent = | (Flow rate out) × ((% $CO_2$) + 0.5 × (% CO))/100 |
| $O_2$ in effluent as $H_2O$ = | (grams $H_2O$ collected/hr) × (1 mol $H_2O$/ 18 g $H_2O$) × (1 mol $O_2$/2 mol $H_2O$) × (24,200 cc $O_2$/mol $O_2$) × (1 hr/60 min) |
| $O_2$ in feed = | (flow rate in) × (% $CO_2$ in feed)/100 |
| $O_2$ leakage in effluent (based on % $N_2$) = | (flow rate out) × (21% $O_2$/79% $N_2$) × (% $N_2$)/100 |
| $O_2$ flux per unit surface area = | Total $O_2$ flux/surface area of membrane exposed to fuel "mix". |

Unless otherwise specified herein, all parts, percents, ratios and the like are by volume at standard temperature and pressure (STP, 25° C. and 1 atmosphere). When temperature or pressure are not specified herein, the temperature is room temperature (about 25° C.) and the pressure is about one atmosphere.

EXAMPLE A-1

The reactor assembly containing the Pd/YSZ dual conductor membrane of Example A is heated to 1100° C. with nitrogen fed at a rate of about 60 cc per minute to the side intended for the oxygen-consuming gas and air fed at 200 cc per minute to the opposite side of the dual-conductor membrane intended for the oxygen-containing gas. The nitrogen stream is then replaced with a gas containing 90 parts hydrogen and 10 parts argon supplied at a rate which delivers 61.0 cc per minute hydrogen gas at STP. The effluent gas is passed through a cold trap of dry-ice/acetone (−78° C.) to collect the water produced and then through a gas collector for gas chromatography analysis. The hydrogen-argon gas mixture is fed to the reactor for three hours, and 1.23 grams of water is collected during that reaction time period.

Gas chromatography analysis shows no nitrogen, indicating that there is no leak of air into the reactor, and that all the oxygen is transported through the dual-conductor disk.

The surface area of the disk exposed to hydrogen is 2.2 $cm^2$ and the amount of oxygen transported through the disk is equivalent to a current density of 550 $mA/cm^2$.

EXAMPLE A-2

The reaction process in this Example is conducted in the same manner as in the preceding Example A-1, except that the hydrogen-argon gas mixture is replaced by a gas mixture containing 17 parts methane and 83 parts nitrogen.

Gas chromatographic analysis of the vent gas reveals that a 94% yield of carbon monoxide is obtained mixed with hydrogen in a 1:2 molar ratio. The amount of oxygen transported through the disk is equivalent to a current density of 531 $mA/cm^2$.

The above result shows that nearly quantitative conversion of a mixture of hydrocarbons to synthesis gas can be obtained without an external circuit for the flow of electrons.

EXAMPLE A-3

The reaction process in this Example is conducted in the same manner as in the preceding Example A-1, except that the dual conductor membrane is replaced with the Pt/YSZ membrane made according to Example B, the hydrogen-argon gas mixture is supplied at a rate which delivers 61.6 cc per minute hydrogen gas at STP, and the hydrogen-argon gas mixture is fed to the reactor for two hours and thirty minutes. The reactor produces 0.38 grams of water.

The surface area of the disk exposed to hydrogen is 1.0 $cm^2$ and the amount of oxygen transported through the disk is equivalent to a current density of 463 $mA/cm^2$.

EXAMPLE A-4

The reaction process in this Example is conducted in the same manner as in the preceding Example A-1, except the dual-conductor membrane is replaced with the $BMgLaCrO_x$/YSZ membrane made in accordance with Example C, the hydrogen-argon gas mixture is fed to the reactor over a period of one hour, and 0.107 grams of water is collected during that reaction time period.

The surface area of the disk exposed to hydrogen is 2.8 $cm^2$ and the amount of oxygen transported through the disk is equivalent to a maximum current density of 114 $mA/cm^2$

EXAMPLE A-5

The reaction process in this Example is conducted in the same manner as in the preceding Example A-1, except (a) the dual-conductor membrane is replaced with the PrYZr-$BMgLaCrO_x$/YSZ membrane made according to Example D above positioned so that the side impregnated with praeseodynium, yttrium, and zirconium comes in contact with the hydrogen-argon gas mixture, (b) the hydrogen-argon gas mixture is fed to the reactor for one hour and thirty minutes (Run A) and for a period of two hours (Run B), and (c) 0.16 grams and 0.22 grams of water are collected during Runs A and B, respectively.

The surface area of the disk exposed to hydrogen is 2.8 $cm^2$, so that the amount of oxygen transported through the disk is equivalent to a current density of 114 $mA/cm^2$ for Run A and 117 $mA/cm^2$ for Run B.

EXAMPLE A-6

The reaction process in this Example is conducted in the same manner as in the preceding Example A-1, except the dual-conductor membrane is replaced with the $PrInO_x$/YSZ membrane made according to Example E, the hydrogen-argon gas mixture is fed to the reactor for two hours, and 0.90 grams of water is collected during that reaction time period.

Gas chromatography analysis shows no nitrogen, indicating that there is no leak of air into the reactor, and that all the oxygen is transported through the dual-conductor disk.

The surface area of the disk exposed to hydrogen is 2.2 $cm^2$ and the amount of oxygen transported through the disk is equivalent to a current density of 601 $mA/cm^2$.

EXAMPLE A-7

The perovskite disc of Example F is placed on a 330 stainless steel support plate in the furnace. Corning ground glass (#1724) is mixed with water to make a paste. A thin layer of the paste is then coated on the rim of the disc and a zirconia or mullite tube is then placed on the disc, allowing the wet paste to form a seal. The tube and disc are then heated in the furnace. At 925° C. the ground glass melts to form a leak tight seal between the disc and tube. The reactor is then heated to the desired temperature with nitrogen fed to the sealed side of the disc (tube side) and air fed to the opposite side. Once the disc is at the desired temperature, the nitrogen feed is replaced with fuel for measuring the oxygen flux. The conditions for measurement are 1100° C., 60 cc/min fuel fed to the sealed side of the disc, and 200 cc/min of air fed to the opposite side of the disc. The disc is tested with a standard fuel "mix" which consists of 57% $H_2$, 21.5% $CO_2$, 16.5% $CH_4$, 5.0% Ar.

EXAMPLES A-8 to A-14

The reaction process of Example Nos. A-8 to A-14 is conducted in the same manner as preceding Example A-7, except the solid membrane of Example A-7 is replaced with the solid membranes of Examples G–N, respectively. The reaction conditions in Example Nos. A-8 to A-14 are the same as in Example A-7.

The oxygen flux data for Example Nos. A-7 to A-14 is summarized in Table I below.

TABLE I

Oxygen Flux Data

| Example No. | Membrane Composition | SA (cm$^2$) | Prep. Method | O$_2$ Flux (cc/min × cm$^2$) | mA/cm$^2$ |
|---|---|---|---|---|---|
| A-7 | La$_{.2}$Sr$_{.8}$CoO$_x$ | 0.6 | A | 19.5 | 5206 |
| A-8 | La$_{.2}$Ca$_{.8}$CoO$_x$ | 0.6 | A | 21.0 | 5607 |
| A-9 | La$_{.2}$Sr$_{.8}$CoO$_x$ | 0.5 | B | 30.7 | 8197 |
| A-10 | La$_{.2}$Sr$_{.8}$FeO$_x$ | 0.6 | B | 19.8 | 5287 |
| A-11 | La$_{.2}$Sr$_{.8}$Fe$_{.8}$Cr$_{.2}$O$_x$ | 1.4 | B | 7.5 | 2002 |
| A-12 | Gd$_{.2}$Sr$_{.8}$CoO$_x$ | 0.6 | B | 8.6 | 2296 |
| A-13 | La$_{.2}$Sr$_{.8}$Fe$_{.8}$Cr$_{.1}$Co$_{.1}$O$_x$ | 1.2 | C | 15.3 | 4085 |
| A-14 | La$_{.2}$Sr$_{.8}$Fe$_{.8}$Mn$_{.2}$O$_x$ | 1.2 | C | 9.0 | 2403 |

SA = Surface Area Exposed to Fuel
Powder Preparation Methods:
A = Oxide Prep
B = Thermal Decomposition of Nitrates or Acetates
C = Citric Acid Prep

Unsaturated Hydrocarbon Production Results

In the following specific examples, saturated hydrocarbons were treated in accordance with the method of the present invention for producing unsaturated hydrocarbons in a laboratory reactor made from a 60 cm. long (10 mm. OD, 8 mm. ID) tube of 8% yttria-stabilized zirconia obtained from Zircoa Products (Corning). The inside of the tube is coated with a thin layer of silver ink (Engelhard A3148) diluted with alpha-terpineol to provide a permeable cathode. A stripe of silver ink is painted onto the outside of the tube from one end to about the center. The tube is heated in air at 765° C. for about 15 minutes.

The outer surface of the tube then is coated with the anode material, slightly overlapping the silver stripe.

The dehydrogenation catalyst is prepared by impregnating quartz wool with a 5% solution of $PtCl_2$ in water. The excess solution is decanted. The $PtCl_2$ coated quartz wool is oven dried for two hours at 120° C., and then calcined at 800° C. in air for about 16 hours.

Silver wires are attached to the ends of the cathode and anode with solder. A 40 cm. section of 14 mm outside diameter and 12 mm inside diameter quartz tube is fitted over the center section of the zirconia tube using SWAGELOK™ tube fittings and teflon ferrules. The void space between the quartz tube and zirconia tube is packed with the dehydrogenation catalyst, Pt on quartz wool. A SWAGELOK™ tube fitting also is attached to each end of the zirconia tube which extends out of the quartz sleeve. The assembly is placed in a split furnace capable of heating to 1100° C., and the silver wires are connected through an ammeter.

The electrodes are conditioned as follows: air is passed through the inside of the zirconia tube at 50 cc./min. Nitrogen is passed through the space between the zirconia and quartz tubes at the rate of 20 cc./min., and the tube is heated to 700° C. over the course of about hours. After reaching about 700° C., the nitrogen flow (20 cc/min.) is replaced by the saturated hydrocarbon, and the experiment commences.

In the following experiments, the saturated hydrocarbon is ethane, the reactor temperature is maintained at 700° C., the pressure is about 1 atmosphere, and the residence time in the reactor is kept constant from run to run. Samples of the gaseous products are obtained at about 20 minute intervals, and the gas samples are analyzed by gas chromatography on either a Carle Series S 111 H or a Carle Series S 400 gas chromatograph outfitted to analyze refinery gas mixtures. In some of the experiments, an external potential was applied by means of a Lambda Model 530 power supply connected in series with the ammeter.

Comparative Example 1 is an example of an uncatalyzed thermal ethane dehydrogenation reaction. It was conducted in an all quartz reactor with the reactor void volume packed with a low surface area silica (an inert packing material). Comparative Example 2 is an example of an ethane dehydrogenation reaction carried out in the electrocatalytic reactor without a dehydrogenation catalyst. The reactor void volume is packed with the same low surface area silica so that the contact times of the gases in Comparative Examples 1 and 2 would be nearly identical. The electrocatalytic reactor in Comparative Example 2, and in Examples B-1 and B-2, was fabricated with a silver cathode and silver anode on an yttria-stabilized zirconia solid electrolyte.

Examples B-1 and B-2 are examples of the process of the present invention utilizing the same electrocatalytic reactor as used in Comparative Example 2 packed with a dehydrogenation catalyst in accordance with the present invention. In Example B-1, the external circuit is connected, but no potential is applied to the cell. In Example B-2, the external circuit is connected and a potential of 0.8 volts is applied to the cell.

TABLE II

| Example | Applied Voltage | $C_2H_6$ Converted (%)* | $C_2H_4$ Select. (%)** | $C_2H_4$ Yield (%)*** | % $H_2$ Effl. |
|---|---|---|---|---|---|
| Comp. 1 | N/A | 16.7 | 91.8 | 15.4 | 13.3 |
| Comp. 2 | 0.0 | 23.9 | 87.8 | 20.9 | 0.0 |
| B-1 | 0.0 | 31.1 | 91.4 | 28.4 | 4.2 |
| B-2 | 0.8 | 34.8 | 87.0 | 30.0 | 0.7 |

$$^*C_2H_6 \text{ Converted} = \frac{\text{Moles C in all products}}{\text{Moles C fed as } C_2H_6} \times 100$$

$$^{**}C_2H_4 \text{ Selectivity} = \frac{\text{Moles C in } C_2H_4}{\text{Moles C in all products}} \times 100$$

$$^{***}C_2H_4 \text{ Yield} = \frac{\text{Moles } C_2H_4 \text{ produced}}{\text{Total Moles of saturated hydrocarbon in the feed stream}} \times 100$$

The results of Examples B-1 and B-2 indicate that the process of the present invention has ethylene yields greater than ethylene yields of both the thermal dehydrogenation reaction with no electrocatalytic reactor (Comparative Example 1) and thermal dehydrogenation in the electrocatalytic reactor not packed with a dehydrogenation catalyst (Comparative Example 2). A higher yield of ethylene is obtained when a potential is applied (Example B-2) than without an applied potential (Example B-1). As can be seen from the decrease in effluent hydrogen in Example B-2, hydrogen appears to be preferentially consumed while maintaining high ethylene selectivity. The effect of the dehydrogenation catalyst can be seen from the increased ethane conversion and increased effluent hydrogen in Example B-1 compared to Comparative Example 2.

EXAMPLE B-3

A disc prepared as in Example E is fitted into the reactor and sealed with glass powder obtained from Corning (No. 8161 with a softening point of 600° C.) suspended in isobutanol. The seal is cured at 750° C. for 30 minutes. The temperature is raised to 874° C. with nitrogen passing over the fuel side and air (200 cc/min) passing over the other side of the disc. The nitrogen is replaced with ethane (57.2 cc/min). The liquid produced is collected in a dry ice/acetone trap and weighed after 60 minutes on stream with ethane. The product gas is collected and analyzed by gas chromatography. After 60 minutes the temperature is lowered to 591° C. with nitrogen on the fuel side of the disc. Ethane (49.2 cc/min) replaces the nitrogen and products are collected as before. After 78 minutes the temperature is raised to 693° C. and maintained at that temperature for one hour. The temperature is raised to 780° C. The temperature is maintained at 780° C. for three hours, the flow rate of ethane is increased to 82 cc/min, and the experiment continued for an additional 102 minutes. The ethane is replaced with nitrogen and the temperature is reduced to 640° C. Propane (33 cc/min) replaced the nitrogen and the temperature is maintained fro an additional three hours. Helium replaced the propane and the reactor is allowed to cool to room temperature. The results of these experiments are summarized in the Table below.

TABLE III

Conversion to Unsaturated Hydrocarbons with
$(In_2O_3)_{0.475}(PrO_2)_{0.05}(ZrO_2)_{0.475}$

| Fuel | Flow cc/min | Temp ° C. | Conversion % | Selectivity % Olefins | Flux mA/cm$^2$ |
|---|---|---|---|---|---|
| Ethane | 57.2 | 874 | 94.3 | 25.4 | 689 |
| Ethane | 49.2 | 591 | 1.7 | 63.5 | 77 |
| Ethane | 49.2 | 780 | 73.9 | 64.0 | 467 |
| Ethane | 82.0 | 780 | 70.6 | 73.4 | 708 |
| Propane | 33.3 | 640 | 65.4 | 74.7 | 447 |

The reactor was disassembled and the disc was cut off of the support tube with a diamond saw. A small portion of the support tube which had been adjacent to the disc was cut off, and approximately a one inch section of the α-SIC feed tube that had been adjacent to the disc was removed as well. These three materials were weighed, placed in a tube furnace in air, and heated to 750° C. to burn off any carbon deposited thereon. After cooling, the samples were weighed again and the carbon deposition was calculated as a function of the exposed surface are. The results are summarized in the Table below.

TABLE IV

Carbon deposition Measurements on Materials used
in Alkane Dehydrogenation Reactor

| Material | Carbon Deposition mg/cm$^2$ |
|---|---|
| Yttria-stabilized zirconia support tube | 3.4 |
| α-SIC | 1.1 |
| $(In_2O_3)_{0.475}(PrO_2)_{0.05}(ZrO_2)_{0.475}$ | <0.3* |

*Essentially no weight change was noted, so that this is an upper limit of the carbon deposition based on the detection limit of the balance.

The present invention relates to an improved continuous process for converting saturated hydrocarbons to unsaturated hydrocarbons. The process incorporates the features of a catalyzed non-oxidative ethane dehydrogenation reaction in combination with a selective hydrogen oxidation reaction. The inventors believe that the net result of the process, as expressed below by the reaction equations, is a selective saturated hydrocarbon oxydehydrogenation reaction.

Using the conversion of ethane to ethylene as an example, the inventors believe that the process can be represented as follows:

$$C_2H_6 = C_2H_4 + H_2 \quad \text{(Reaction 1)}$$
$$H_2 + 1/2\,O_2 = H_2O \quad \text{(Reaction 2)}$$
$$\overline{C_2H_6 + 1/2\,O_2 = C_2H_4 + H_2O} \quad \text{(Net Process Reaction)}$$

Since the process appears to be a net oxidation reaction, there apparently is essentially no thermodynamically imposed limit on the saturated hydrocarbon conversion.

Because the improved process appears to rake use of a selective hydrogen oxidation reaction (Reaction 2 above) to remove the equilibrium limitation of the Thermal dehydrogenation reaction (Reaction 1 above), high ethane conversions with high ethylene selectivities are possible. Additionally, since the improved process is capable of operating at substantially lower temperatures than the commercial ethane to ethylene process, less coking occurs and subsequently the process of the present invention would likely experience less down time than the commercial process.

Although the inventors believe the above hypothesized reaction sequence to be correct, they desire that the scope of invention not be bound by this theory of operation, but rather is defined by the entire spirit and scope of this disclosure.

Aromatic Compound Substitution Results

In the following Examples D-1 to D-7 and C-1, the mixtures of hydrogen-containing aromatic compound and second hydrogen-containing compound are treated in accordance with the method of the present invention in a laboratory reactor similar to the reactor illustrated in FIGS. 1 and 2. The reactor cell is made from a 60 cm. long (10 mm. outside diameter (OD), 8 mm. inside diameter (ID)) tube of 8% yttria-stabilized zirconia obtained from Zircoa Products (Corning). The inside surfaces of the tube are coated with a thin layer of silver ink (Engelhard A3148) diluted with alpha-terpineol to provide a permeable cathode. A 4 inch long silver anode and contacting stripe is painted on the outside surface of the tube opposite the cathode, again using Engelhard A3148 silver ink. The tube is heated in air at 850° C. to bond the silver to the tube. The silver electrodes are connected to an external circuit via silver wires attached with solder to the ends of the two electrodes.

A 40 cm. section of 14 mm. outside diameter quartz tube is fitted over the center section of the zirconia tube using SWAGELOK™ tube fitting and Teflon/ferrules. A SWAGELOK™ tube fitting also is attached to each end of the zirconia tube which extends out of the quartz sleeve. The assembly is placed in a split furnace capable of heating to 1100° C., and the silver wires are connected through an ammeter and an adjustable current power supply via circuits which permit current to flow with, or without, added electrical potential from the power supply.

The electrodes are conditioned as follows: air is passed through the inside of the zirconia tube at 50 cc./min. Nitrogen is passed through the space between the zirconia and quartz tubes at the rate of 50 cc/min., and the tube is heated to 700° C. over the course of about 90 minutes. After reaching a desired reaction temperature, the 50 cc/min. nitrogen flow is replaced by a flow of gas containing a mixture of an aromatic compound and a second hydrogen-containing compound, and the experiment commences.

In the following Examples D-1 to D-5 and Control-Example C-1, the aromatic compound is benzene and the second hydrogen-containing compound is ethylene. In Example D-6 the aromatic compound is benzene and the second hydrogen-containing compound is ethane. In Example D-7, the aromatic compound is benzene and the second hydrogen-containing compound is methane. Control Example C-1 is an open circuit experiment so that no oxygen ions are transported through the zirconia to the benzene/ethylene feed. Samples of the gaseous products are obtained at about 30 minute intervals, and the gas samples are analyzed by gas chromatography. The electric current values are steady-state values and the benzene Conversion reported is the conversion at the termination of the experiment. In Examples D-1 to D-5, an external potential is applied by means of a Lambda Model 530 power supply connected in series with the ammeter. All of the experiments are conducted at atmospheric pressure.

Unless otherwise provided, all parts, percents, ratios and the like are by moles.

TABLE VI-continued

| Ex. No. | Temp. (° C.) | Product | mmole/min | Rate of Production mmole/min-gram* |
|---|---|---|---|---|
| D-6 | 700 | Styrene | 0.0014 | 0.0020 |
| D-7 | 750 | Toluene | 0.0007 | 0.0011 |

*Rate per gram of electrode material.

The results in Tables V and VI show that when the circuit is closed, allowing oxygen to be transported through the zirconia wall, conversion and selectivity increase. The currents recorded in Table V show that electricity can be generated as a useful byproduct, and the results also show that the rate of benzene conversion can be increased by the application of a voltage between the electrodes.

Example D-6 shows that styrene can be made directly from benzene and ethane. Example D-7 shows that benzene can be coupled with methane and the generality of aromatic alkylation.

The effect of increasing temperature from 650° C. to 700° C. on alkylation with ethylene is a general increase in percentage of benzene converted. Increased selectivity for styrene is observed for alkylation with ethylene in Example No. D-2 compared with Example No. D-1 as a result of an increase in the ethylene to benzene ratio.

TABLE V

| Ex. No. | Temp. (° C.) | Applied Voltage (V) | Current (mA) | Ratio Alk./Bz | Benzene Conv. (%) | Product Selectivity % | | | |
|---|---|---|---|---|---|---|---|---|---|
| | | | | | | Biph. | Styr. | EtBz | Tol. |
| C-1 | 650 | — | — | C₂H₄/Bz 0.86 | 0.4 | 36.0 | 64.0 | — | — |
| D-1 | 650 | 0.5 | 228 | C₂H₄/Bz 0.84 | 1.4 | 24.0 | 68.6 | 4.3 | 3.1 |
| D-2 | 650 | 0.5 | 205 | C₂H₄/Bz 1.76 | 1.8 | 6.2 | 87.5 | 5.3 | 3.9 |
| D-3 | 650 | 2.0 | 650 | C₂H₄/Bz 1.37 | 3.4 | 8.4 | 79.8 | 5.9 | 5.9 |
| D-4 | 700 | 0.5 | 323 | C₂H₄/Bz 1.84 | 8.3 | 14.6 | 75.4 | 4.9 | 5.1 |
| D-5 | 700 | 2.0 | 839 | C₂H₄Bz 1.81 | 10.5 | 21.8 | 68.6 | 4.4 | 5.2 |
| D-6 | 700 | 2.0 | 767 | C₂H₆/Bz 3.7 | 1.3 | 53.9 | 29.1 | 12.8 | 4.2 |
| D-7 | 750 | 0 | 47 | CH₄/Bz 3.0 | 2.4 | 87.6 | — | — | 12.3 |

Key:

| Abbreviation | Represents |
|---|---|
| Alk. | Alkane or alkene |
| Biph. | Biphenyl |
| Bz | Benzene |
| Et | Ethyl |
| EtBz | Ethylbenzene |
| Styr. | Styrene |
| Tol. | Toluene |

The alk./bz ratio is a molar ratio.

TABLE VI

| Ex. No. | Temp. (° C.) | Product | mmole/min | Rate of Production mmole/min-gram* |
|---|---|---|---|---|
| C-1 | 650 | Styrene | 0.0008 | 0.0011 |
| D-1 | 650 | Styrene | 0.0054 | 0.0075 |
| D-2 | 650 | Styrene | 0.0034 | 0.0047 |
| D-3 | 650 | Styrene | 0.0073 | 0.0102 |
| D-4 | 700 | Styrene | 0.0180 | 0.0251 |
| D-5 | 700 | Styrene | 0.0240 | 0.0335 |

Gas Cleanup Results

The following Examples E-1 to E-9 illustrate preparation of zirconia tubes which may be used in the electrochemical cell for gas cleanup according to the present invention similar to the reactor illustrated in FIGS. 9 and 10. These examples are not to be construed as limiting upon the scope of the invention as generally disclosed in the specification.

EXAMPLE E-1

Preparation of open end tube having PbO/Au cathode and Pbo/Au anode.

A dense, 12-mm outside diameter (OD), 1-mm wall yttria-stabilized zirconia tube obtained from Zircoa Products, Solon, Ohio, (hereinafter "YSZ tube 1") is coated on both its inner and outer surfaces with a thin layer of a slurry prepared from equal volumes of PbO and gold ink (Engelhard Part No. A 4650, Lot No. M-13966) dispersed in alpha-terpineol. The organic solvent is evaporated by drying the tube in air at 85° C. for 15–30 minutes. The coated tube is suspended in an Inconel 600 tube in a furnace and heated to 850° C. under flowing air. The temperature is maintained at 850° C. overnight and then the tube is allowed to cool to room temperature.

EXAMPLE E-2

Preparation of open end tube having Pt cathode and Pt anode:

A YSZ tube 1 is treated with a suspension of 5 vol. % CoO, 60 vol. % NiO, and 35 vol. % $ZrO_2$, in alphaterpineol along the entire inside length of the tube and along 40.6 cm. of the 61.0 cm. external length. The tube is coated and dried at 120° C. in air; the coating procedure is repeated two times more. The coated tube is heated at 1650° C. for two hours and cooled. The fired tube is treated by soaking it in concentrated HCl and then rinsed with distilled water. This is repeated until the color of HCl solution remained unchanged. The anode is prepared on the inner surface of the tube by treating it with a suspension of Pt ink (Engelhard) containing 3 wt.% $Bi_2O_3$ in alphaterpineol. The cathode is prepared similarly by painting the suspension on the appropriate outer surface. The tube is dried at 120° C. in air and fired at 1065° C. for 15 minutes. Resistance measurements show that the electrodes are electrically conductive.

EXAMPLE E-3

Preparation of open end tube having Pt/K+K cathode and Pt anode:

Following the procedure of Example E-2, after the platinum electrodes have been applied to the anode and the cathode, and before the tube is dried at 120° C. in air, a dilute solution of potassium hydroxid in water is applied to the cathode. Resistance measurements show that the Pt/K+K cathode and the anode are electrically conductive.

EXAMPLE E-4

Preparation of closed end tubes:

Closed end tubes are prepared by a slip-casting technique from an aqueous slurry of 5 mole% yttria-stabilized zirconia at a pH of 9. The tubes are 9.52 mm outside diameter (O.D.) and 6.35 mm inside diameter (I.D.), 26.7 cm long, and closed at one end. The tubes are fired at 1000° C., removed and polished. After refiring at 1100° C. the tubes (hereinafter "YSZ tube 2") are ready for the electrode application.

Platinum electrodes are prepared by coating the inside surface (anode) and the outer surface (cathode) of a YSZ tube 2 with platinum ink (Engelhard) diluted with terpineol. The top one inch of the outer surface is left uncoated. After pouring off the excess ink, the tube is fired at 1500° C. The electrode resistance is tested with a multimeter. If the resistance of either the inner or outer coating measures higher than 0.5 ohms, the process of coating and firing is repeated. The second and subsequent coatings are fired at 1000° C. Typically 7–9 coatings are required to achieve the desired resistance.

The following examples illustrate preparation of catalyst-containing reactor tubes.

EXAMPLE E-5

Preparation of closed end tube having $La_2O_3$/Pt cathode and Pt anode:

One gram of $La_2O_3$ is mixed with 5 ml of terpineol. The external platinum surface of a closed end YSZ tube 2 prepared according to Example E-4 is then coated with this slurry. Only 10% of the slurry is coated onto the tube, covering the bottom 4 inches of the tube. The reactor is then carefully assembled while the catalyst coating is still wet. The YSZ tube 2 is inserted into a quartz liner with the coated region extending into the hot zone of the furnace and the appropriate gas fittings are added. The reactor is then fired to reaction temperature slowly over the course of 3–4 hours. As the reactor is being heated, the electrodes are purged with air to remove the evaporating terpineol.

EXAMPLE E-6

Preparation of closed end tube having $La_{0.6}Sr_{0.4}CoO_x$/Pt cathode and Pt anode:

The procedure of Example E-5 is followed, except that the one gram of $La_2O_3$ is replaced with approximately one gram of $La_{0.6}Sr_{0.4}CoO_x$ perovskite during slurry preparation for the catalyst coating.

EXAMPLE E-7

Preparation of closed end tube having $ZnMnO_4$/Pt cathode and Pt anode.

The procedure of Example E-5 is followed, except that the one gram of $La_2O_3$ is replaced with approximately one gram of $ZnMoO_4$ during slurry preparation for the catalyst coating.

EXAMPLE E-8

Preparation of closed end tube having an $FeWO_4$/Au cathode and Pt anode:

Anode preparation:

A YSZ tube supplied by Zircoa Products is coated on the inside surface with platinum ink diluted with terpineol. The platinum ink (Engelhard) is diluted to approx. 20% with the alcohol. One end of the YSZ tube is plugged before adding the platinum slurry. After adding the platinum ink, the tube is rolled to evenly coat the interior surface. Excess ink is poured out of the tube and reserved for later coatings. The terpineol is evaporated in a drying oven at 100° C. for 1 hour. The platinum anode is fired at 1065° C. for 15 minutes. Two additional platinum coatings are required to reduce the anode resistance to less than one ohm.

Cathode preparation:

The YSZ tube with platinum anode prepared according to the above is coated with a gold-iron tungstate cathode. The cathode is prepared by mixing gold ink (Engelhard) with iron tungstate (approx. 10:1 by weight). Approximately one gram of starch is added to this mixture as a pore former. This mixture is diluted with 5 ml terpineol. The resulting slurry is applied to the exterior of the tube, coating the entire surface except for the top and bottom 10.2 cm of the tube. Excess material is reserved for subsequent coatings. The terpineol is evaported in a drying oven at 100° C. for 1 hour before firing at 850° C. for 2 hours. One additional coating is done to lower the cathode resistance.

EXAMPLE E-9

Preparation of closed end tube having zinc ferrite ($ZnFe_2O_3$) cathode and platinum anode.

The procedure of Example E-5 is followed except that the one gram of $La_2O_3$ is replaced with one gram of zinc ferrite.

Sulfur Dioxide Removal Examples:

The tubes prepared above are placed into a quartz tube and fitted with connectors to permit admission of gas mixtures to the core and annular regions. This is accomplished by fitting a section of 14 mm. outside diameter quartz tube over the center section of the zirconia tube using SWAGELOK™ tube fittings and Teflon™ ferrules. A SWAGELOK™ tube fitting also is attached to each end of the zirconia tube which extends out of the quart sleeve. The assembly is placed in a split furnace capable of heating to 1100° C., and the lead wires are connected through an ammeter and an adjustable current power supply via circuits which permit current to flow with, or without, added electrical potential from the power supply.

The electrodes are conditioned as follows:

The apparatus is suspended in a split furnace and heated to 800° C. with air passing through the annular region and nitrogen through the core region. When the reactor reaches 800° C., as indicated on a thermocouple in the furnace, the nitrogen flow is replaced with hydrogen at 20 cc/min and the air is replaced with a stream of 100 ml/min of 1% (by volume) $SO_2$ in helium.

The flow rate of 1% sulfur dioxide and the temperature is adjusted as indicated in the Tables below, and the results of Fourier transform-infrared analysis of the product gas are summarized.

The formulas used to calculate the percent reduction in sulfur dioxide in the effluent and the net percent sulfur removed from the effluent are as follows:

$$\% \ SO_2 \ reduced = \frac{(ppm \ SO_2 \ in \ feed - ppm \ SO_2 \ in \ effluent) \times 100}{ppm \ SO_2 \ in \ feed}$$

$$\% \ net \ S \ removed = \% \ SO_2 \ reduced - \frac{ppm \ COS \ in \ effluent}{ppm \ SO_2 \ in \ feed} \times 100$$

Unless stated otherwise, all parts, percents, ratios and the like are in moles (based on weight and/or volume measurements) and "ppm" represents parts per million by volume (which is roughly equivalent to parts per million by number of moles based on the well known gas law PV=nRT for ideal gases).

The data obtained using these procedures is presented in Tables VII to XVI below. The numerical values for each Example in the Tables are based on an average of at least two runs. Sulfur is found in the cold region of the used tubes.

TABLE VII

CATHODE: PbO/Au and
ANODE: PbO/Au
per Example C-1

| Ex. E-1: | Temp. (° C.) | Applied Potential Volts | Flow 1% $SO_2$ mL/min | Current mA | % $SO_2$ converted |
|---|---|---|---|---|---|
| 1-1 | 900 | 0.0 | 100 | 30 | 1.0 |
| 1-2 | 900 | 0.037 | 100 | 30 | 11.0 |
| 1-3 | 900 | 0.885 | 100 | 230 | 83.0 |
| 1-4 | 900 | 1.3 | 100 | 270 | 96.5 |
| 1-5 | 900 | 1.5 | 100 | 280 | 99.0 |
| 1-6 | 900 | 0.037 | 15 | 20 | 93.6 |
| 1-7 | 800 | 0.0 | 100 | 60 | 1.8 |

Example 1-1 shows that $SO_2$ can be reduced using hydrogen as the fuel gas in a short-circuited electrochemical cell. Examples 1-2 through 1-6 demonstrate that $SO_2$ can be removed effectively by applying a potential and utilizing hydrogen as the fuel in an electrochemical cell. Example 1-7 shows results obtained with this cell at 800° C.

The 1% sulfur dioxide stream is replaced with one containing only 98 ppm sulfur dioxide, and the experiments are repeated. The results are summarized in Table VIII below.

TABLE VIII

CATHODE: PbO/Au and
ANODE: PbO/Au
per Example C-1

| Ex. E-2: | Temp. (° C.) | Applied Potential Volts | 98 ppm $SO_2$ mL/min | Current mA | % $SO_2$ converted |
|---|---|---|---|---|---|
| 2-1 | >900 | 0.0 | 100 | 10 | 76.5 |
| 2-2 | >900 | 0.0 | 15 | 10 | 80.1 |
| 2-3 | 800 | 0.0 | 100 | 10 | 69.8 |
| 2-4 | 800 | 0.0 | 50 | 10 | 86.8 |

The results in Table VIII demonstrate that sulfur dioxide levels can be significantly reduced using hydrogen as the fuel in the absence of an applied potential. The results also demonstrate that sulfur dioxide can be reduced even in very dilute streams.

TABLE IX

CATHODE: Pt and
ANODE: Pt
per Example C-2
FUEL GAS: $H_2$, 20 ML/MIN

| Ex. E-3: | Temp. (° C.) | Applied Potential, V | 1% $SO_2$ ml/min | Air ml/min | Current mA | % $SO_2$ Removal |
|---|---|---|---|---|---|---|
| 3-1 | 900 | — | 100 | — | 90 | 20.6 |
| 3-2 | 900 | — | 30 | — | 70 | 84.8 |
| 3-3 | 910 | — | 30 | — | 70 | 82.1 |
| 3-4 | 1000 | — | 30 | — | 80 | 98.5 |
| 3-5 | 1000 | — | 100 | — | 140 | 55.1 |
| 3-6 | 1000 | — | 100 | — | 140 | 52.7 |
| 3-7 | 1000 | — | 100 | — | 140 | 52.0 |

The results in Table IX demonstrate that sulfur dioxide reduction can be carried out using electrodes of Pt.

The reactor cell of Table IX is then conditioned at 1000° C. by replacing the gas stream containing 1% $SO_2$ with air at 100 ml/min. and feeding nitrogen gas to the anode side of the reactor cell over a period of about 18 hours. The results obtained using this conditioned reactor cell are shown in Table X below.

TABLE X

CATHODE: Pt and
ANODE: Pt
per Example C-2
FUEL GAS: $H_2$, 20 ML/MIN

| Ex. | Temp. (° C.) | Applied Potential, V | 1% $SO_2$ ml/min | Air ml/min | Current mA | % $SO_2$ Removal |
|---|---|---|---|---|---|---|
| E-4: | | | | | | |
| 4-1 | 1000 | — | 100 | — | 120 | 36.5 |
| 4-2 | 1000 | — | 100 | — | 120 | 36.5 |
| 4-3 | 1000 | — | 100 | — | 110 | 36.9 |
| 4-4 | 1000 | — | 100 | 5 | 230 | 10.2 |
| 4-5 | 1000 | — | 30 | 70 | 980 | 64.8 |
| 4-6 | 1000 | — | 50 | 50 | 940 | 64.4 |
| 4-7 | 1000 | — | 80 | 20 | 820 | 29.1 |
| 4-8 | 1000 | — | 100 | — | 80 | 24.7 |
| 4-9 | 1000 | — | 100 | 5 | 220 | 0 |

The results in Table X demonstrate that the reduction to sulfur occurs even in the presence of air. The difference in %$So_2$ removal between Tables IX and X appears to be due to some sintering of Pt which may have occurred during the 18 hour conditioning at 1000° C.

TABLE XI

CATHODE: Pt (K + K) and
ANODE: Pt
per Example C-3
FUEL GAS: $H_2$, 20 ML/MIN

| Ex. | Temp. (° C.) | Applied Potential, V | 1% $SO_2$ ml/min | Air ml/min | Current mA | % $SO_2$ Removal |
|---|---|---|---|---|---|---|
| E-5: | | | | | | |
| 5-1 | 920 | — | 100 | — | 100 | 5.3 |
| C/1 | 1000 | OPEN | 100 | — | — | 0 |
| 5-2 | 1000 | — | 100 | — | 60 | 26.5 |
| 5-3 | 1000 | — | 30 | — | 70 | 82.4 |

The results in Table XI demonstrate that sulfur dioxide removal occurs in the cell when the circuit is closed (Ex. nos. 5-1 to 5-3), but not when there is no short-circuit (Comparative Example C/1).

The reactor cell of Table XI is then conditioned at 1000° C. by diluting the gas stream containing 1% $SO_2$ with 15 ml/min. air. This reactor cell is then purged (cathode region) with 30 ml/min. air and then switched to the gas stream containing 1% $SO_2$. The results obtained using this conditioned reactor cell are shown in Table XII below.

TABLE XII

CATHODE: Pt (K + K) and
ANODE: Pt
per Example C-3
FUEL GAS: $H_2$, 20 ML/MIN

| Ex. | Temp. (° C.) | Applied Potential, V | 1% $SO_2$ ml/min | Air ml/min | Current mA | % $SO_2$ Removal |
|---|---|---|---|---|---|---|
| E-5: | | | | | | |
| 5A-1 | 1000 | — | 30 | — | 30 | 20.1 |
| 5A-2 | 1000 | — | 30 | 15 | 480 | 44.8 |

The results in Table XII indicate that sintering of the platinum may have occurred during the air treatment at 1000° C. The results also demonstrate that the alkalidoped cathode is effective in removing sulfur dioxide in the presence of air (Ex. No.5A-2).

Examples of data obtained using reactor cells coated with various catalytic materials are shown in Tables XIII–XVII below.

TABLE XIII

CATHODE: $La_2O_3$/Pt and
ANODE: Pt
per Example C-5
FUEL GAS: $H_2$, 20 ML/MIN

| Ex. | Temp, ° C. | I, mA | App., V | Feed | ppm $SO_2$ Effluent | ppm COS Effluent | % $SO_2$ Reduced | Net % S Removed |
|---|---|---|---|---|---|---|---|---|
| E-6: | | | | | | | | |
| C/2 | 650 | — | OPEN | B | 8462 | — | 15.4 | 15.4 |
| 6-1 | 650 | 80 | 0 | B | 58 | — | 99.4 | 99.4 |
| C/3 | 650 | — | OPEN | B | 8028 | — | 19.7 | 19.7 |
| 6-2 | 650 | 80 | 0 | B | 1086 | — | 89.2 | 89.2 |
| 6-3 | 650 | 80 | 0 | A | 168 | 9 | 94.9 | 94.7 |
| 6-4 | 650 | 80 | 0 | B | 110 | — | 98.9 | 98.9 |
| 6-5 | 650 | 80 | 0 | A | 350 | 19 | 89.4 | 88.8 |
| 6-6 | 650 | 70 | 0 | C | 136 | 21 | 95.8 | 95.3 |
| 6-7 | 650 | 70 | 0 | D | 599 | 27 | 81.8 | 81.0 |
| 6-8 | 650 | 70 | 0 | A | 445 | 22 | 86.5 | 85.8 |

FEED:
A = 16 ml/min 0.33% $SO_2$, 6.2% $O_2$, 12.8% $CO_2$, Bal. $N_2$
B = 16 ml/min 1% $SO_2$, Bal. He
C = 38 ml/min 0.33% $SO_2$, 6.2% $O_2$, 12.8% $CO_2$, Bal. $N_2$
D = 83 ml/min 0.33% $SO_2$, 6.2% $O_2$, 12.8% $CO_2$, Bal. $N_2$ Examples 6-1, 6-2, 6-4, and Comparative Examples C/2 and C/3 show that the %$SO_2$ reduced and net %S removed for gas streams containing 1% $SO_2$ is highly efficient (>85%) when the reactor cell short circuit is complete in accordance with the present invention (Exs. 6-1, 6-2, and 6-4) as contrasted with the less than 20% $SO_2$ reduction and net %S removal due to the presence of the catalyst alone when the circuit is open (C/2 and C/3). Examples 6-3 and 6-5 to 6-8 show that sulfur dioxide can be removed with high efficiency and the production of noxious COS (carbonyl sulfide) can be minimized without an applied voltage to the reactor cell and-when the reactor cell is fed a mixture of $SO_2$, $O_2$, $CO_2$ and $N_2$ simulating the composition of a flue gas.

TABLE XIV

CATHODE: La.6Sr.4CoO3/Pt and
ANODE: Pt
per Example C-6
FUEL GAS: $H_2$, 20 ML/MIN

| Ex. | Temp, ° C. | I, mA | App., V | Feed | ppm $SO_2$ Effluent | ppm COS Effluent | % $SO_2$ Reduced | Net % S Removed |
|---|---|---|---|---|---|---|---|---|
| E-7: | | | | | | | | |
| 7-1 | 700 | 110 | .032 | A | — | 1265 | 100 | 49.4 |
| 7-2 | 600 | 40 | .032 | A | 103 | 842 | 95.9 | 62.2 |
| 7-3 | 575 | 30 | .032 | A | 364 | 408 | 85.4 | 69.1 |
| 7-4 | 550 | 20 | .032 | A | 873 | 204 | 65.1 | 56.9 |
| 7-5 | 550 | 30 | 0.1 | A | 604 | 253 | 75.8 | 65.7 |
| 7-6 | 525 | 15 | .032 | A | 1166 | 109 | 53.4 | 49.0 |
| 7-7 | 525 | 20 | 0.1 | A | 972 | 129 | 61.1 | 56.0 |
| 7-8 | 525 | 30 | 0.32 | A | 520 | 233 | 79.2 | 70.0 |
| 7-9 | 500 | 10 | .032 | A | 1534 | 64 | 38.6 | 36.1 |
| 7-10 | 500 | 20 | 0.3 | A | 1112 | 105 | 55.5 | 51.3 |
| 7-11 | 525 | 30 | 0.4 | A | 393 | 324 | 84.3 | 71.3 |
| 7-12 | 525 | 40 | 0.6 | A | 24 | 697 | 99.0 | 71.2 |
| 7-13 | 475 | 10 | .032 | A | 1569 | 36 | 37.2 | 35.8 |

TABLE XIV-continued

CATHODE: La.6Sr.4CoO3/Pt and
ANODE: Pt
per Example C-6
FUEL GAS: $H_2$, 20 ML/MIN

| Ex. | Temp, °C. | I, mA | App., V | Feed | ppm $SO_2$ Effluent | ppm COS Effluent | % $SO_2$ Reduced | Net % S Removed |
|---|---|---|---|---|---|---|---|---|
| 7-14 | 475 | 20 | 1.1 | A | 566 | 151 | 77.4 | 71.3 |
| 7-15 | 475 | 30 | 1.5 | A | 224 | 289 | 91.0 | 79.5 |
| 7-16 | 450 | 20 | 2.0 | A | 622 | 116 | 75.1 | 70.5 |
| 7-17 | 525 | 30 | 0.4 | A | 204 | 324 | 91.8 | 78.9 |
| 7-18 | 525 | 20 | 0.4 | B | — | 861 | 100 | 65.6 |
| 7-19 | 525 | 30 | 0.4 | A | 189 | 354 | 92.4 | 78.3 |
| 7-20 | 525 | 30 | 0.4 | C | 2131 | 79 | 14.8 | 11.6 |
| 7-21 | 525 | 60 | 1.1 | C | 1091 | 197 | 56.4 | 48.5 |
| 7-22 | 525 | 70 | 1.25 | C | 876 | 246 | 65.0 | 55.2 |
| 7-23 | 525 | 80 | 1.5 | C | 509 | 389 | 79.6 | 64.1 |
| 7-24 | 525 | 90 | 1.8 | C | 256 | 680 | 89.8 | 62.5 |
| 7-25 | 525 | 30 | 0.4 | C | 257 | 370 | 89.7 | 74.9 |
| 7-26 | 525 | 45 | 0.4 | D | 433 | 19 | 79.9 | 79.0 |
| 7-27 | 525 | 55 | 0.6 | D | 385 | 17 | 82.1 | 81.3 |

FEED:
A = 30 ml/min 0.25% $SO_2$, 14.4% $CO_2$, Bal. $N_2$
B = 15 ml/min 0.25% $SO_2$, 14.4% $CO_2$, Bal. $N_2$
C = 60 ml/min 0.25% $SO_2$, 14.4% $CO_2$, Bal. $N_2$
D = 35 ml/min 0.25% $SO_2$, 14.4% $CO_2$, 6% $O_2$, Bal. $N_2$ Examples 7-1 to 7-27 show a series of examples in which temperature, applied voltage, feed gas composition, and feed gas flow rate are varied for a given reactor cell. The effect of applied voltage on %$SO_2$ reduced and net %S removed is somewhat greater at temperatures less than 525° C. than at higher temperatures.

TABLE XV

CATHODE: ZnMo4/Pt and
ANODE: Pt
per Example C-7
FUEL GAS: $H_2$, 20 ML/MIN

| Ex. | Temp, C. | I, mA | App., V | ppm $SO_2$ Effluent | ppm COS Effluent | % $SO_2$ Reduced | Net % S Removed |
|---|---|---|---|---|---|---|---|
| E-8: | | | | | | | |
| 8-1 | 800 | 130 | 0 | 238 | 1010 | 90.5 | 50.1 |
| 8-2 | 700 | 70 | 0 | 177 | 1462 | 92.9 | 34.4 |
| 8-3 | 650 | 50 | 0 | 148 | 997 | 94.1 | 54.2 |
| 8-4 | 600 | 40 | 0 | 121 | 724 | 95.2 | 66.2 |
| C/4 | 600 | — | OPEN | 2411 | 23 | 3.6 | 2.6 |

Feed: 30 ml/min 14.4% $CO_2$, 0.25% $SO_2$, Bal. $N_2$

Examples 8-1 to 8-4 show that emission of $SO_2$ and COS can be significantly reduced in another reactor cell of the present invention without an applied voltage to the cell. Catalytic and thermal activity alone in Comparative Example C/4 is minimal in comparison.

TABLE XVI

CATHODE: $FeWO_4$/Au and
ANODE: Pt
per Example C-8
FUEL GAS: $H_2$, 20 ML/MIN

| Ex. | Temp, C. | I, mA | App., V | Feed | ppm $SO_2$ Effluent | ppm COS Effluent | % $SO_2$ Reduced | Net % S Removed |
|---|---|---|---|---|---|---|---|---|
| E-9: | | | | | | | | |
| 9-1 | 800 | 410 | 0.75 | A | 388 | 178 | 88.2 | 82.8 |
| 9-2 | 850 | 105 | .037 | B | 1045 | — | 89.6 | 89.6 |
| 9-3 | 850 | 200 | 0.75 | B | 214 | — | 97.9 | 97.9 |
| 9-4 | 800 | 120 | 0.75 | B | 613 | — | 93.9 | 93.9 |
| C/5 | 800 | — | OPEN | B | 9888 | — | 1.1 | 1.1 |
| C/6 | 800 | — | OPEN | A | 6752 | 11 | — | — |
| 9-5 | 800 | 100 | 0.75 | A | 2763 | 18 | 16.3 | 15.7 |

FEED:
A = 30 ml/min 6.2% $O_2$, 0.33% $SO_2$, 12.8% $CO_2$, Bal. $N_2$
B = 30 ml/min 1% $SO_2$, Bal. He Table XVI shows that the present invention achieves substantially greater $SO_2$ removal and COS minimization (Examples 9-1 to 9-4) than achieved by catalytic and thermal activity alone (Comparative Examples C/5 and C/6).

TABLE XVII

CATHODE: $ZnFe_2O_4$/Pt
ANODE: Pt
per Example C-9

| Ex. | Temp, C. | I, mA | App., V | Feed | ppm $SO_2$ Effluent | % $SO_2$ Reduced |
|---|---|---|---|---|---|---|
| E-10: | | | | | | |
| 10-1 | 700 | 40 | 0 | A | 7650 | 17.7 |
| 10-2 | 700 | 50 | 0.1 | A | 6350 | 31.7 |
| 10-3 | 700 | 65 | 0.2 | A | 5147 | 44.7 |
| 10-4 | 700 | 80 | 0.3 | A | 3497 | 62.4 |
| 10-5 | 700 | 100 | 0.3 | B | 229 | 97.5 |
| C/7 | 700 | OPEN | OPEN | B | 12,587 | * |
| 10-6 | 700 | 100 | 0.3 | B | 366 | 96.0 |
| 10-7 | 700 | 160 | 0.3 | C | 201 | 97.6 |
| C/8 | 700 | OPEN | OPEN | C | 19,256 | * |
| C/9 | 700 | OPEN | OPEN | C | 7273 | 12.4 |
| 10-8 | 700 | 250 | 0.3 | C | 548 | 93.4 |
| 10-9 | 700 | 200 | 0.2 | C | 418 | 95.0 |
| 10-10 | 700 | 180 | 0.032 | C | 582 | 93.0 |

* = $SO_2$ concentration of effluent exceeds that of feed indicating adsorbed $SO_2$ is desorbing from the catalyst during the experiment
A = 9300 ppm $SO_2$ in He
B = 9200 ppm $SO_2$, 2700 ppm $O_2$ in $N_2$
C = 8300 ppm $SO_2$, 21,000 ppm $O_2$ in $N_2$ Experiments 10-1 through 10-4 show that zinc ferrite is an effective electrocatalyst for the reduction of $SO_2$, and that increasing driving force (applied potential) increases the removal rate. Experiment 10-1 also shows that no potential is needed to reduce $SO_2$.

Experiments 10-5 and 10-6 and Comparative Experiment C/7 show that in the presence of oxygen zinc ferrite is still an effective $SO_2$ reduction electrocatalyst and that under the open circuit conditions of Comparative Experiment C/7, where no oxygen transport occurs, $SO_2$ is not removed. In fact, previously adsorbed $SO_2$ begins to desorb.

Experiment 10-7 shows that higher concentrations of oxygen do not adversely affect the $SO_2$ reduction process, and Comparative Experiment C/8 shows that when the circuit is opened to stop oxygen transport, the $SO_2$ reduction ceases and $SO_2$ desorption begins. Comparative Experiment C/9 is conducted about 24 hours after Comparative Experiment C/8 and shows that the $SO_2$ desorption process stops when all of the adsorbed $SO_2$ is removed and the $SO_2$ concentration nearly matches the feed.

Experiments 10-8 through 10-10 show that re-establishing oxygen transport re-establishes the $SO_2$ reduction process, i.e., the process is reversible and associated with oxygen transport.

The combined results in Tables XIII–XVII show that when the electrochemical cell comprises a catalyst coating, not only is a high percentage of sulfur dioxide removed from the effluent, but also a high net percentage of sulfur is removed from the effluent due to the low levels of carbonyl sulfide formed as a reaction product between sulfur dioxide and carbon dioxide in the mixed feeds which are characteristic of exhaust and flue gas effluent. Tables XIII–XVII also demonstrate that a wide variety of catalytic materials can be used to advantage in increasing reactor cell efficiency and that the increased efficiency is tied to the oxygen ion transport of the reactor cell element of the present invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An electrochemical process for extracting oxygen from an oxygen-containing gas which comprises
   (A) providing an electrochemical cell comprising first and second zones separated by a solid multi-component membrane comprising an intimate, gas-impervious, multi-phase mixture of an electronically conductive phase and an oxygen ion-conductive phase,
   (B) passing a gas containing $N_2O$, NO, $NO_2$, $SO_2$, or $SO_3$, or a mixture thereof in contact with the membrane in the first zone, and
   (C) passing a gas capable of reacting with oxygen in contact with the membrane in the second zone.

2. The electrochemical process of claim 1 wherein the gas capable of reacting with oxygen comprises a gas selected from the group consisting of methane, natural gas, ethane, hydrogen gas, hydrogen sulfide, or carbon monoxide, and mixtures thereof.

3. The electrochemical process of claim 1 wherein the electronically-conductive phase comprises a material selected from the group consisting of silver, gold, platinum, palladium, rhodium, ruthenium, bismuth oxide, a praseodymium-indium oxide mixture, a cerium-lanthanum oxide mixture, a niobium-titanium oxide mixture, or an electron-conductive mixed metal oxide material of a perovskite structure, and mixtures thereof.

4. The electrochemical process of claim 1 wherein the electronically-conductive phase comprises platinum or palladium metal.

5. The electrochemical process of claim 1 wherein the solid multi-component membrane comprises a mixed metal oxide material of a perovskite structure containing a combination of elements selected from the group consisting of lanthanides, alkaline earth metals, Y, Sc, Ti, V, Cr, Mn, Fe, Co, Ni, Cu, Zn, Zr, and Nb, oxides thereof, and mixtures of these metals and metal oxides.

6. The electrochemical process of claim 5 wherein the mixed metal oxide material of a perovskite structure comprises a combination of elements selected from the group consisting of La, Co, Y, Sr, Ca, Fe, Cr, oxides thereof, and mixtures of these metals and metal oxides.

7. The electrochemical process of claim 5 wherein the mixed metal oxide material of a perovskite structure comprises a lanthanide in combination with a material selected from the group consisting of Co, Sr, oxides of Co, and oxides of Sr.

8. The electrochemical process of claim 1 wherein the gas containing $N_2O$, NO, $NO_2$, $SO_2$ or $SO_3$, or a mixture thereof, is derived from burning of a sulfur-containing fuel.

9. The electrochemical process of claim 1 wherein the gas passed in contact with the membrane in the first zone comprises $SO_2$ or $SO_3$, or a mixture thereof.

10. The process of claim 1 conducted at a temperature in the range from about 300° C. to about 1000° C.

11. The process of claim 1 conducted at a temperature in the range from about 500° C. to about 1400° C.

12. An electrochemical process for extracting oxygen from an oxygen-containing gas which comprises
   (A) providing an electrochemical cell comprising first and second zones separated by a solid multi-component membrane comprising an intimate, gas-impervious, multi-phase mixture of an electronically conductive phase and an oxygen ion-conductive phase,
   (B) passing a gas containing $N_2O$, NO, $NO_2$, $SO_2$ or $SO_3$, or a mixture thereof in contact with the membrane in said first zone, and
   (C) passing a gas capable of reacting with oxygen in contact with the membrane in said second zone wherein a catalyst is present in said first zone.

13. The electrochemical process of claim 12 wherein the catalyst is present as a coating on the first surface of the multi-component membrane.

14. The electrochemical process of claim 12 wherein the catalyst is present on a support adjacent to the first surface of the multi-component membrane.

15. An electrochemical process for extracting oxygen from a n oxygen-containing gas which comprises
   (A) providing an electrochemical cell comprising first and second zones separated by a solid multi-component membrane comprising an intimate, gas-impervious, multi-phase mixture of an electronically conductive phase comprising praseodymium doped indium oxide, and an oxygen ion-conductive phase,
   (B) passing a gas containing $N_2O$, NO, $NO_2$, $SO_2$, or $SO_3$, or a mixture thereof in contact with the membrane in the first zone, and
   (C) passing a gas that reacts with oxygen in contact with the membrane in the second zone.

16. An electrochemical process for extracting oxygen from an oxygen-containing gas which comprises
   (A) providing an electrochemical cell comprising first and second zones separated by a solid multi-component membrane comprising an intimate, gas-impervious, multi-phase mixture of an electronically conductive phase and an oxygen ion-conductive phase of substantially perovskite structure,
   (B) passing a gas containing $N_2O$, NO, $NO_2$, $SO_2$, or $SO_3$, or a mixture thereof in contact with the membrane in the first zone, and
   (C) passing a gas capable of reacting with oxygen in contact with the membrane in the second zone.

* * * * *

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | | |
|------|------|---|---|
| 3 | 25 | "two materials Elements" | should read: "two materials. Elements" |
| 3 | 46 | "containing ay oxygen-containing" | should read: "containing an oxygen-containing" |
| 4 | 8 | "and a Second zone" | should read: "and a second zone" |
| 4 | 11 | "from about 3000°C to" | should read: "from about 300°C to" |
| 5 | 21 | "passing a as containing" | should read: "passing a gas containing" |

UNITED STATES PATENT AND TRADEMARK OFFICE
CERTIFICATE OF CORRECTION

PATENT NO. : 6,019,885   Page 2 of 10
DATED : February 1, 2000
INVENTOR(S) : Terry J. Mazanec et al It is certified that error appears in the above-identified patent and that said Letters Patent is hereby corrected as shown below:

| Col. | Line | |
|---|---|---|
| 6 | 66 | "oxygen-containing a gas"<br><br>should read:<br>"oxygen-containing gas" |
| 7 | 64 | "of perviosness to gases"<br><br>should read:<br>"of perviousness to gases" |
| 9 | 24 | "$r_A$, $r_B$, $r_C$ are the"<br><br>should read:<br>"$r_A$, $r_B$, $r_O$ are the" |
| 9 | 28,29 | "angstrom and 3 ions"<br><br>should read:<br>"angstrom and B ions" |
| 9 | 44 | "and IIa, the: transition"<br><br>should read:<br>"and IIa, the transition" |

UNITED STATES PATENT AND TRADEMARK OFFICE
CERTIFICATE OF CORRECTION

PATENT NO. : 6,019,885

DATED : February 1, 2000

INVENTOR(S) : Terry J. Mazanec et al

It is certified that error appears in the above-identified patent and that said Letters Patent is hereby corrected as shown below:

| Col. | Line | | |
|---|---|---|---|
| 9 | 65 | "oxygen are preferred" should read: "oxygen are preferred." | |
| 10 | 56 | "lanthaium-calcium-iron" should read: "lanthanum-calcium-iron" | |
| 11 | 27 | "metal oxided, are the most" should read: "metal oxides are the most" | |
| 12 | 39 | "about 5000°C to form" should read: "about 500°C to form" | |
| 14 | 45,46 | "electronically-condutive phase" should read: "electronically-conductive phase" | |

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | |
|------|------|---|
| 15 | 20 | "praseodymiumindium oxide"<br><br>should read:<br>"praeseodymium-indium oxide" |
| 19 | 9 | THERE SHOULD BE A PARAGRAPH BREAK BEFORE THE LINE:<br>"(1) Production of Synthesis Gas" |
| 19 | 15 | "1000 to 13000°C."<br><br>should read:<br>"1000 to 1300°C." |
| 19 | 22 | "embodiment, oxygen-containing"<br><br>should read:<br>"embodiment, the oxygen-containing" |
| 23 | 16 | "catalyst is. not applied"<br><br>should read:<br>"catalyst is not applied" |

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | |
|---|---|---|
| 23 | 27 | "Amorg these catalysts,"<br><br>should read:<br>"Among these catalysts," |
| 23 | 37 | "critical to Practicing"<br><br>should read:<br>"critical to practicing" |
| 23 | 41 | "process of the resent"<br><br>should read:<br>"process of the present" |
| 23 | 44 | "packed easily reducing"<br><br>should read:<br>"packed easily, reducing" |
| 27 | 34 | "Not only car ethylbenzene"<br><br>shpuld read:<br>"Not only can ethylbenzene" |

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | |
|---|---|---|
| 29 | 1 | "9 and by passing"<br>should read:<br>"9 and 10 by passing" |
| 29 | 36 | "unit. area. Thin-walled"<br>should read:<br>"unit area. Thin-walled" |
| 31 | 37 | "using 6,000 psi"<br>should read:<br>"using 60,000 psi" |
| 31 | 62 | "at1650°C for two"<br>should read:<br>"at 1650°C for two" |
| 32 | 37 | "indiun oxide as the"<br>should read:<br>"indium oxide as the" |

UNITED STATES PATENT AND TRADEMARK OFFICE
CERTIFICATE OF CORRECTION

PATENT NO. : 6,019,885

DATED : February 1, 2000

INVENTOR(S) : Terry J. Mazanec et al

It is certified that error appears in the above-identified patent and that said Letters Patent is hereby corrected as shown below:

| Col. | Line |  |
|---|---|---|
| 32 | 41,42 | "hour drops of Darvan C"<br><br>should read:<br>"four drops of Darvan C" |
| 33 | 14 | "7.50 grams $La_{0.2}O_3$,"<br><br>should read:<br>"7.50 grams $La_2O_3$," |
| 34 | 21 | "$La_{0.2}Sr_{0.8}Fe_{x.8}Cr_{0.1}Co_{0.1}O_x$"<br><br>should read:<br>"$La_{.2}Sr_{.8}Fe_{.8}Cr_{.1}Co_{.1}O_x$" |
| 34 | 35 | "$C^{TM\circ}$ dispersing agent"<br><br>should read:<br>"$C^{TM}$ dispersing agent" |
| 38 | 3 | "of about hours."<br><br>should read:<br>"of about 1.5 hours." |

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | |
|---|---|---|
| 38 | 46 | "0.8  34.8  87.0  30.0  0.7"<br>should read:<br>"0.8  34.8  87.0  30.3  0.7" |
| 38 | 56 | "hydrocarbonin the feed stream"<br>should read:<br>"hydrocarbon in the feed stream" |
| 40 | 19 | "appears to rake use"<br>should read:<br>"appears to make use" |
| 40 | 21 | "limitation of the Thermal"<br>should read:<br>"limitation of the thermal" |
| 41 | 18 | "benzene Conversion reported"<br>should read:<br>"benzene conversion reported" |

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | | |
|---|---|---|---|
| 41 | (TABLE V) | " | Ratio Alk./Bz |
| | | D-5 | $C_2H_4B_z$" | should read:
" Ratio Alk./Bz
D-5 $C_2H_4/B_z$"

| 43 | 22 | "$ZrO_2$, in alphaterpineol" | should read:
"$ZrO_2$ in alpha-terpineol"

| 43 | 32 | "alphaterpineol" | should read:
"alpha-terpineol"

| 43 | 45 | "hydroxid in water" | should read:
"hydroxide in water"

UNITED STATES PATENT AND TRADEMARK OFFICE
CERTIFICATE OF CORRECTION

PATENT NO. : 6,019,885
DATED : February 1, 2000
INVENTOR(S) : Terry J. Mazanec et al It is certified that error appears in the above-identified patent and that said Letters Patent is hereby corrected as shown below:

| Col. | Line | |
|------|------|---|
| 45 | 14 | "out of the quart"<br>should read:<br>"out of the quartz" |
| 47 | 65 | "that the alkalidoped"<br>should read:<br>"that the alkali-doped" |
| 48 | 41 | "cell and-when the reactor"<br>should read:<br>"cell and when the reactor" |
| 52 | 27,28 | "in said first zone, and"<br>should read:<br>"in the first zone, and" |
| 52 | 40 | "from a n oxygen-containing"<br>should read:<br>"from an oxygen-containing" |

Signed and Sealed this

First Day of May, 2001

Attest:

NICHOLAS P. GODICI

Attesting Officer     Acting Director of the United States Patent and Trademark Office